United States Patent
Benzoni et al.

(10) Patent No.: US 6,942,397 B2
(45) Date of Patent: Sep. 13, 2005

(54) PACKAGING FOR A FIBER-COUPLED OPTICAL DEVICE

(75) Inventors: Albert M. Benzoni, South Pasadena, CA (US); Mark E. Temple, Rosemead, CA (US); Joel S. Paslaski, Alhambra, CA (US); Henry A. Blauvelt, San Marino, CA (US)

(73) Assignee: Xponent Photonics Inc, Monrovia, CA (US)

( * ) Notice: Subject to any disclaimer, the term of this patent is extended or adjusted under 35 U.S.C. 154(b) by 0 days.

(21) Appl. No.: 10/898,153

(22) Filed: Jul. 24, 2004

(65) Prior Publication Data

US 2005/0041932 A1 Feb. 24, 2005

Related U.S. Application Data

(60) Provisional application No. 60/490,134, filed on Jul. 25, 2003.

(51) Int. Cl.[7] ................................................. G02B 6/36
(52) U.S. Cl. ........................................... 385/92; 385/88
(58) Field of Search ............................. 385/88, 89, 90, 385/91, 92, 94

(56) References Cited

U.S. PATENT DOCUMENTS

| 4,307,934 A | * 12/1981 | Palmer | 385/88 |
| 5,687,267 A | * 11/1997 | Uchida | 385/89 |

* cited by examiner

Primary Examiner—Jennifer Doan
(74) Attorney, Agent, or Firm—David S. Alavi; Christie Parker & Hale LLP

(57) ABSTRACT

A packaged fiber-coupled optical device comprises an alignment housing with a fiber retainer, optical fiber segment(s), and optical component(s) (on substrate(s) with fiber groove (s)). Upon assembly the protruding end(s) of the fiber segment(s) is/are positioned against the fiber retainer, and the fiber groove(s) is/are aligned with the protruding end(s) of the fiber segment(s). The fiber retainer urges the protruding end(s) of the fiber segment(s) into the fiber groove(s). The fiber groove(s) position the protruding end(s) of the optical fiber(s) seated therein for optical coupling with optical component(s). The alignment housing and/or a fiber subassembly may be configured for engaging a mating fiber-optic connector.

28 Claims, 29 Drawing Sheets

PACKAGING FOR A FIBER-COUPLED OPTICAL DEVICE

RELATED APPLICATIONS

This application claims benefit of prior-filed provisional App. No. 60/490,134 entitled "Packaging for a fiber-coupled optical device" filed Jul. 25, 2003 in the names of Albert M. Benzoni, Mark E. Temple, and Henry A. Blauvelt, said provisional application being hereby incorporated by reference as if fully set forth herein.

BACKGROUND

The field of the present invention relates to optical devices coupled to optical fibers. Packaging of fiber-coupled optical devices is disclosed herein.

Packaging an optical component for ready coupling to an optical fiber is a costly and time consuming portion of the manufacturing process for optical devices for telecommunications. Connectors are available for enabling rapid connection between optical fibers, each fiber being provided with one of a pair of mating connectors. In order to provide a packaged optical device with such a connector, it is often the case that a short segment of optical fiber is employed within the package, with one end optically coupled to the device and the other end terminating in the connector and available for connection to another optical fiber with a mating connector.

Disclosed herein are apparatus and methods for providing a packaged fiber-coupled optical device that incorporates a segment of optical fiber. The configuration of the package subassemblies enables the optical device to be readily assembled with and optically coupled to the optical fiber segment, and thereby to be provided with a fiber-optic connector.

SUMMARY

A packaged fiber-coupled optical device may comprise an alignment housing, an optical fiber subassembly, and an optical device subassembly. The alignment housing has a fiber retainer. The optical fiber subassembly has a segment of optical fiber secured coaxially within a fiber ferrule with one end protruding from the ferrule. The optical device subassembly has a device substrate with optical component (s) and a fiber groove thereon. The optical fiber subassembly is mounted on the alignment housing with the protruding end of the fiber segment against the fiber retainer. The optical device subassembly is mounted on the alignment housing with the fiber groove aligned with the protruding end of the fiber segment. The fiber retainer urges the protruding end of the fiber segment into the fiber groove. The fiber groove positions the protruding end of the optical fiber seated therein for optical coupling with at least one optical component on the substrate. The alignment housing and/or the fiber subassembly may be configured for engaging a mating fiber-optic connector, configured with a fiber pigtail, configured for mechanical splicing, and so forth.

A packaged fiber-coupled optical device may comprise an alignment housing, multiple optical fibers, and optical components on one or more substrates with corresponding fiber grooves. The alignment housing has a fiber retainer. The optical fibers are received within the alignment housing with protruding ends thereof positioned against the fiber retainer. The optical components and substrate(s) are mounted on the alignment housing with the fiber grooves aligned with the protruding ends of the fiber segments. The fiber retainer urges the protruding ends of the fiber segments into the fiber grooves. The fiber grooves position the protruding ends of the optical fibers seated therein for optical coupling with corresponding optical components on the substrate(s). The alignment housing may be configured for engaging a mating multi-fiber connector, configured with fiber pigtails, configured for mechanical splicing, and so forth.

A packaged fiber-coupled optical device may further comprise an enclosure housing secured to the alignment housing so as to retain the fiber subassembly and/or the device subassembly mounted thereon. A packaged fiber-coupled optical device may further comprise an electromagnetic shield secured to the device subassembly so as to substantially enclose at least one electrical component thereof. The device subassembly may further comprise a cable, circuit, flexible circuit, and/or other electrical connection to at least one electrical component of the device subassembly.

Objects and advantages pertaining to packaged fiber-coupled optical devices may become apparent upon referring to the disclosed embodiments as illustrated in the drawings and disclosed in the following written description and/or claims.

Figure 1:
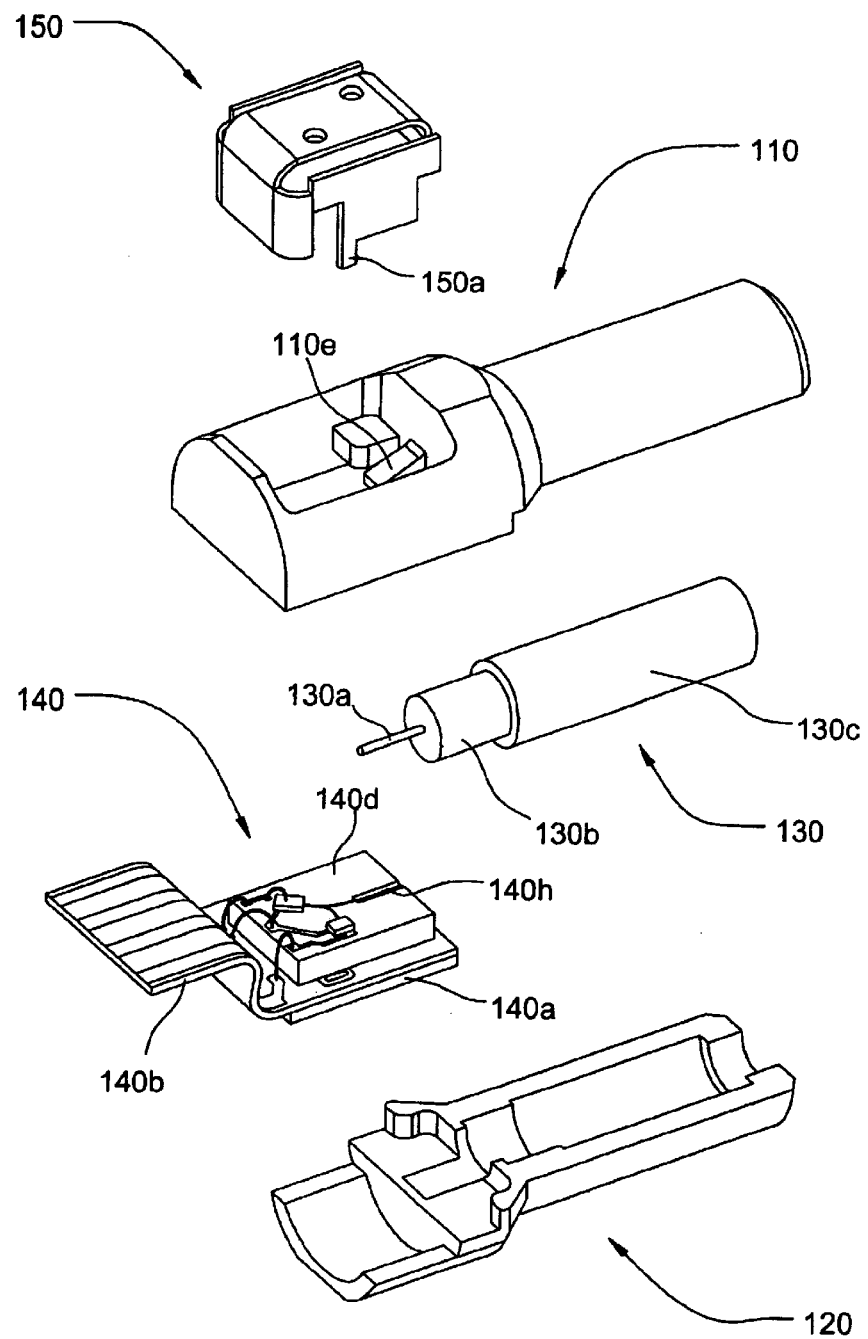
FIG. 1 is an exploded view of an exemplary packaged fiber-coupled optical device.

It should be noted that the designations "top" and "bottom" as used in the present disclosure and appended claims are arbitrary, and are not intended to designate any particular absolute orientation of the packaged fiber-coupled optical device. As used herein, "top" and "bottom" correspond to the orientation of the exploded view of FIG. 1. The sequences of FIGS. 2A–2E, 3A–3G, 4A–4E, 10A–10B, 11A–11C, and 12A–12B do not represent assembly sequences, but rather show the packaged optical device with portions successively added (and selected elements thereby successively concealed shown with dashed lines) to illustrate the structure of the assembled device.

The embodiment shown in the Figures is exemplary, and should not be construed as limiting the scope of the present disclosure and/or appended claims.

DETAILED DESCRIPTION OF EMBODIMENTS

FIGS. 1, 2A–2E, 3A–3G, 4A–4E, and 5A–5B illustrate an exemplary packaged fiber-coupled optical device and its construction and assembly. A device subassembly 140 may include one or more optical components 140g mounted on a device substrate 140d. Device substrate 140d includes a fiber groove 140h, positioned so that an optical fiber seated therein will be optically coupled to at least one of the components 140g. The exemplary device assembly 140 includes a flexible ribbon cable or flexible circuit 140b and a base plate 140a. Wire leads 140e are employed to connect conductors 140f in the ribbon cable or flexible circuit 140b to electrical traces on the device substrate 140d. Wire leads may also be employed to make connections between electrical traces and/or optical components on substrate 140d.

A fiber subassembly 130 includes a short length of optical fiber 130a mounted in a fiber ferrule 130b, which in turn slides into fiber sleeve 130c. The optical fiber 130a is typically stripped of its outer polymeric coating, leaving only core and cladding. The outer diameter of such a stripped optical fiber is typically 125 μm, although optical fibers of other diameters may be employed within the scope of the present disclosure. The size and shape of the groove 140h are such that the protruding first end of stripped fiber 130a, when seated within the groove, is properly transversely aligned for optical coupling with optical component(s) 140g on substrate 140d (within operationally acceptable limits; see below). The proper size and shape for groove 140h may be readily determined based on the outer diameter of stripped optical fiber 130a and the size and position of corresponding component(s) 140g on substrate 140d. The inner diameter of fiber sleeve 130c is chosen so as to enable alignment of the non-protruding second end of fiber 130a with a second optical fiber using a standard optical fiber connector. The non-protruding second end of fiber 130a is typically substantially flush with the corresponding end of ferrule 130b in this embodiment. Such a mating connector (not shown) would typically include a ferrule, similar to ferrule 130b, with the second optical fiber secured therein. Sliding the ferrule of the mating connector into sleeve 130c up against the end of ferrule 130b would result in end-coupling of fiber 130a with the second fiber. Material(s) employed for forming ferrule 130b and sleeve 130c may include, but are not limited to: metal(s), ceramic(s), plastic(s), glass(es), and other suitable materials. It should be noted that ferrule 130b and sleeve 130c may or may not be formed from the same material(s).

Figure 2A:
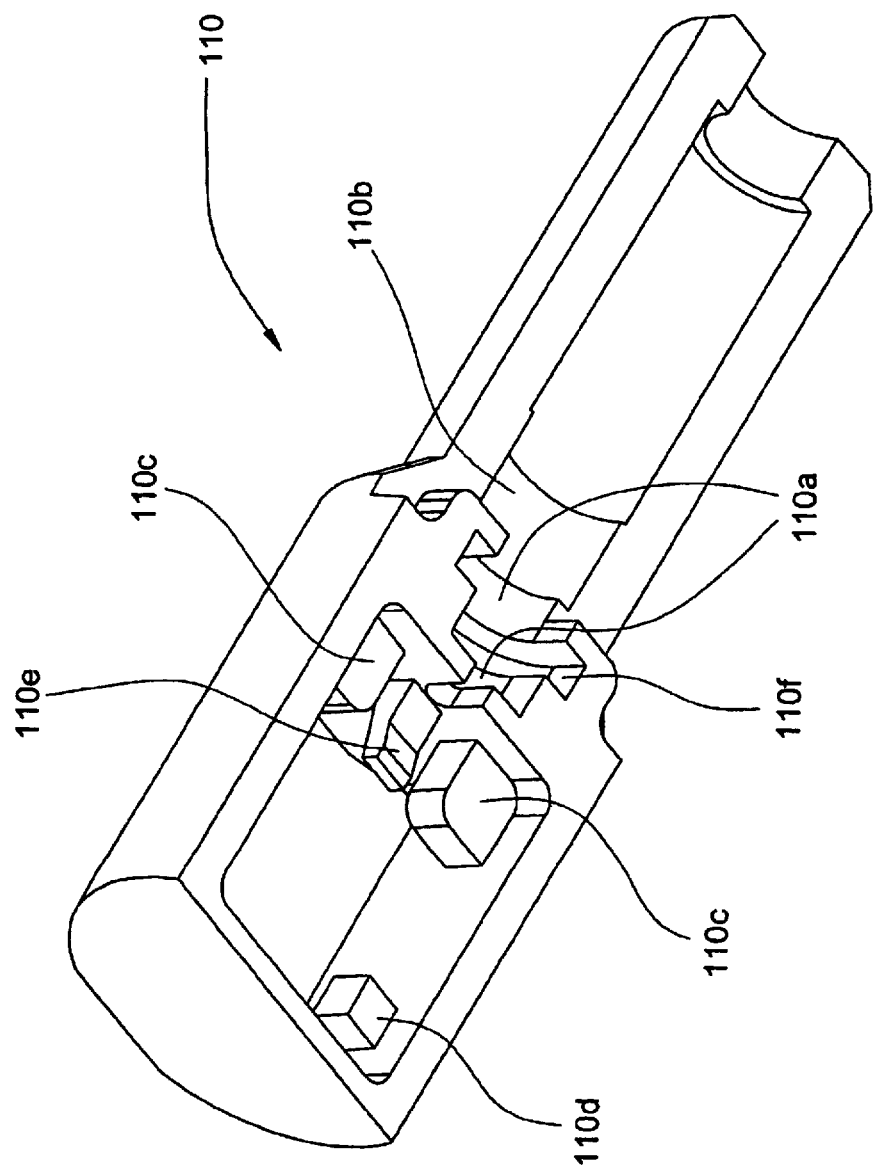
FIGS. 2A–2E are perspective views from below illustrating the construction of an exemplary packaged fiber-coupled optical device.
Figure 2B:
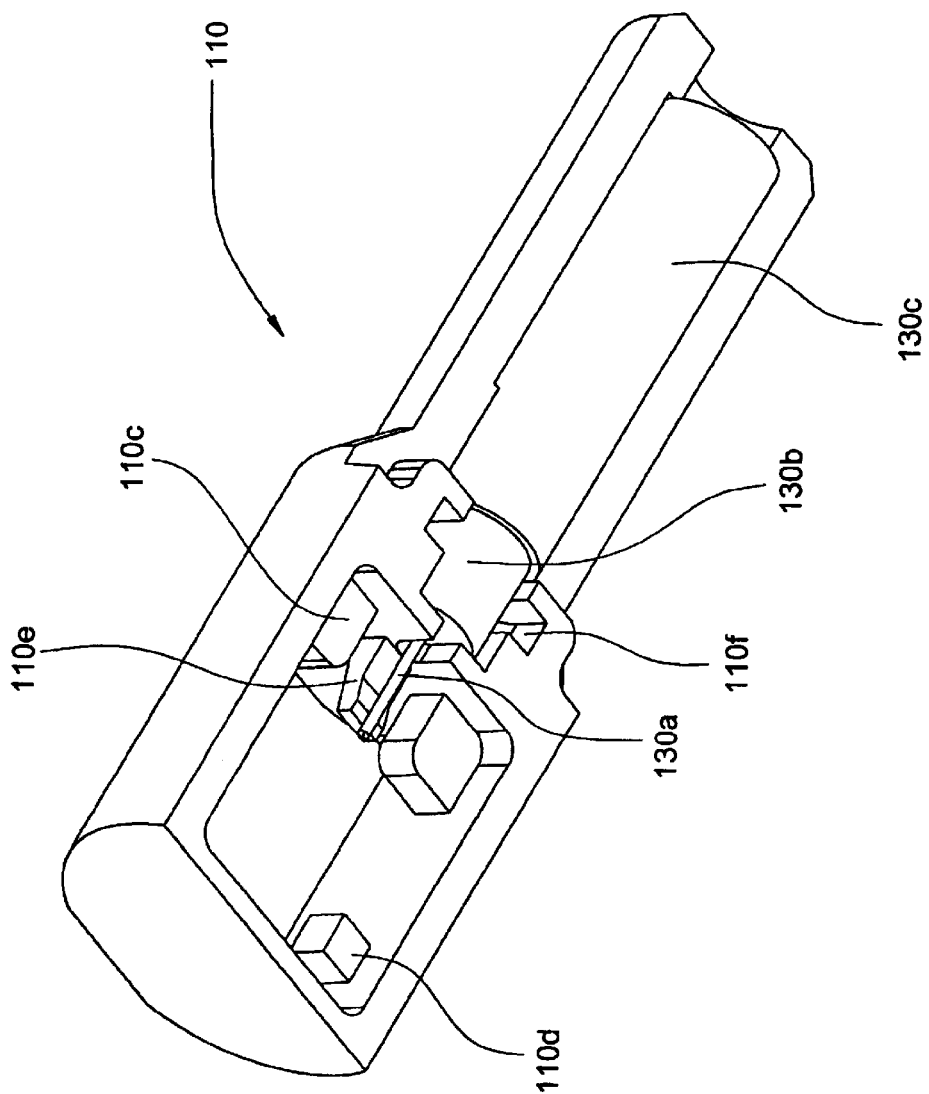
Figure 2C:
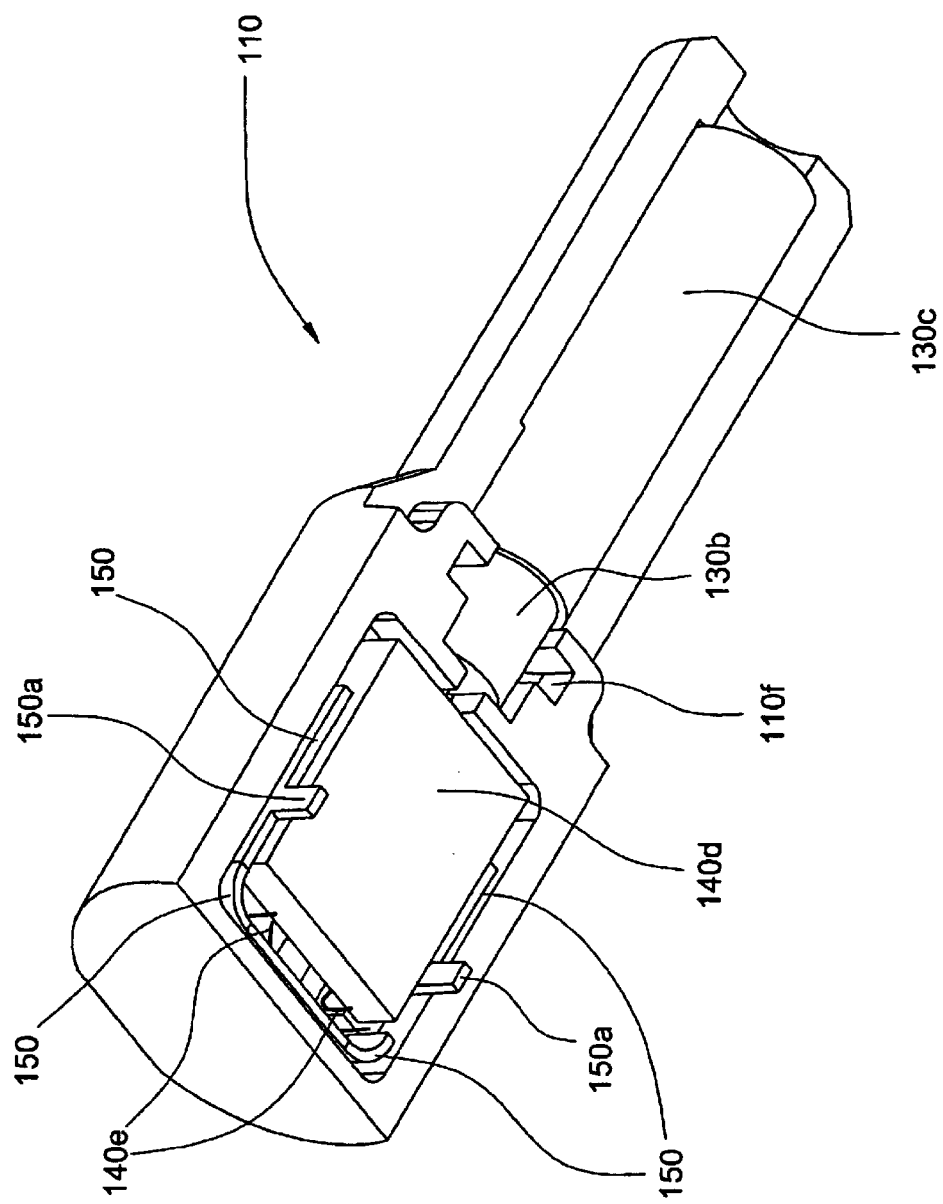
Figure 2D:
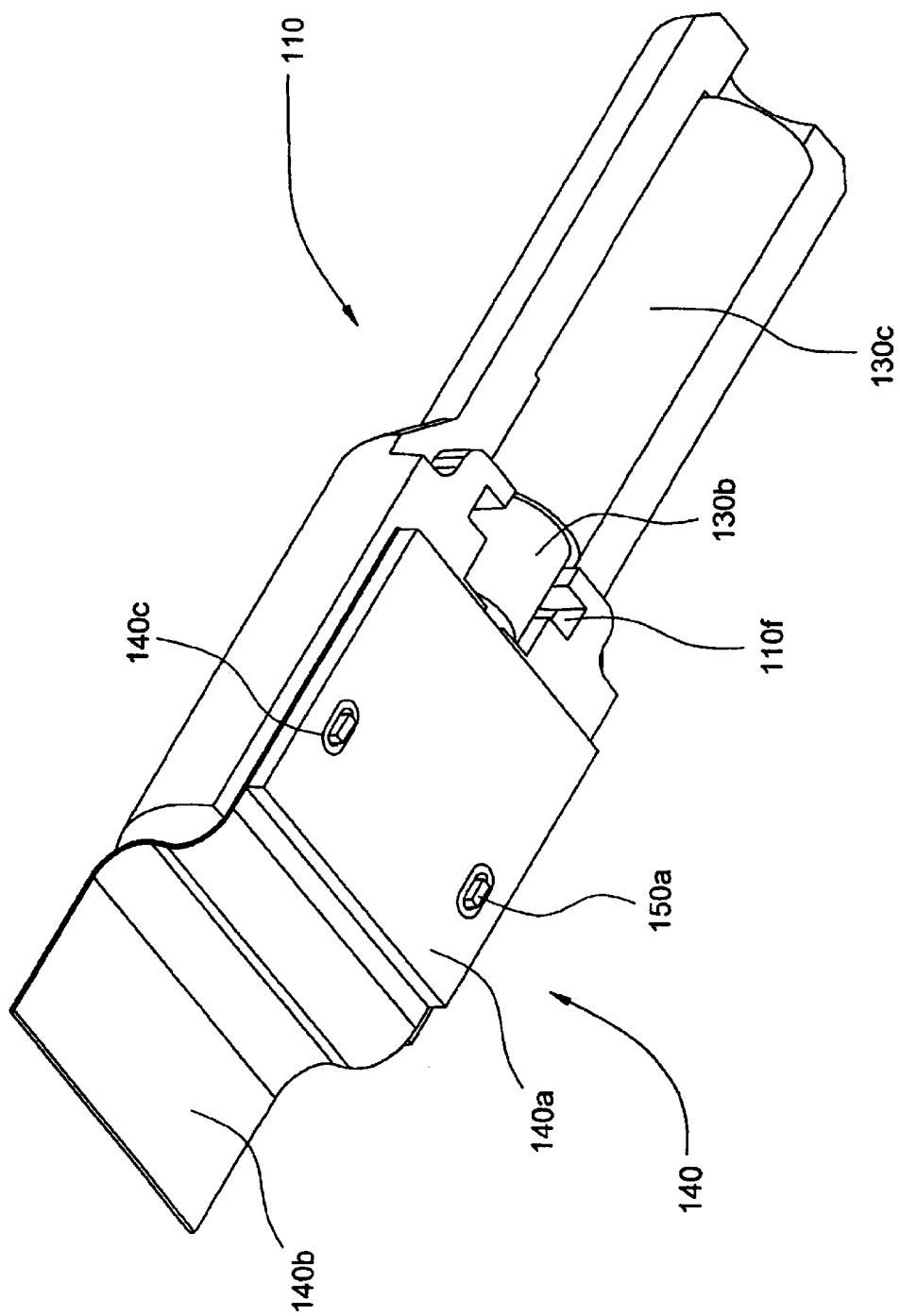
Figure 2E:
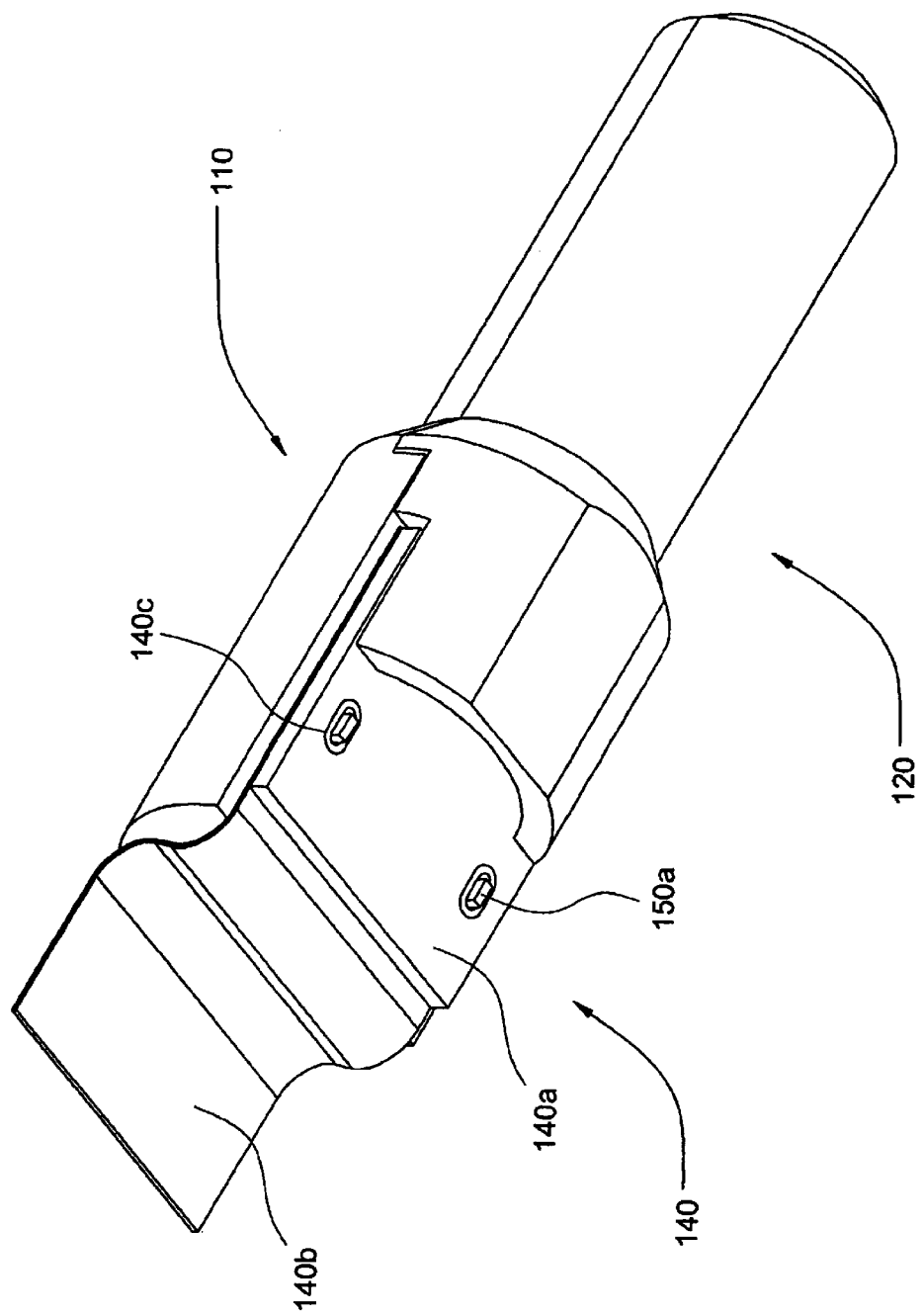
Figure 3A:
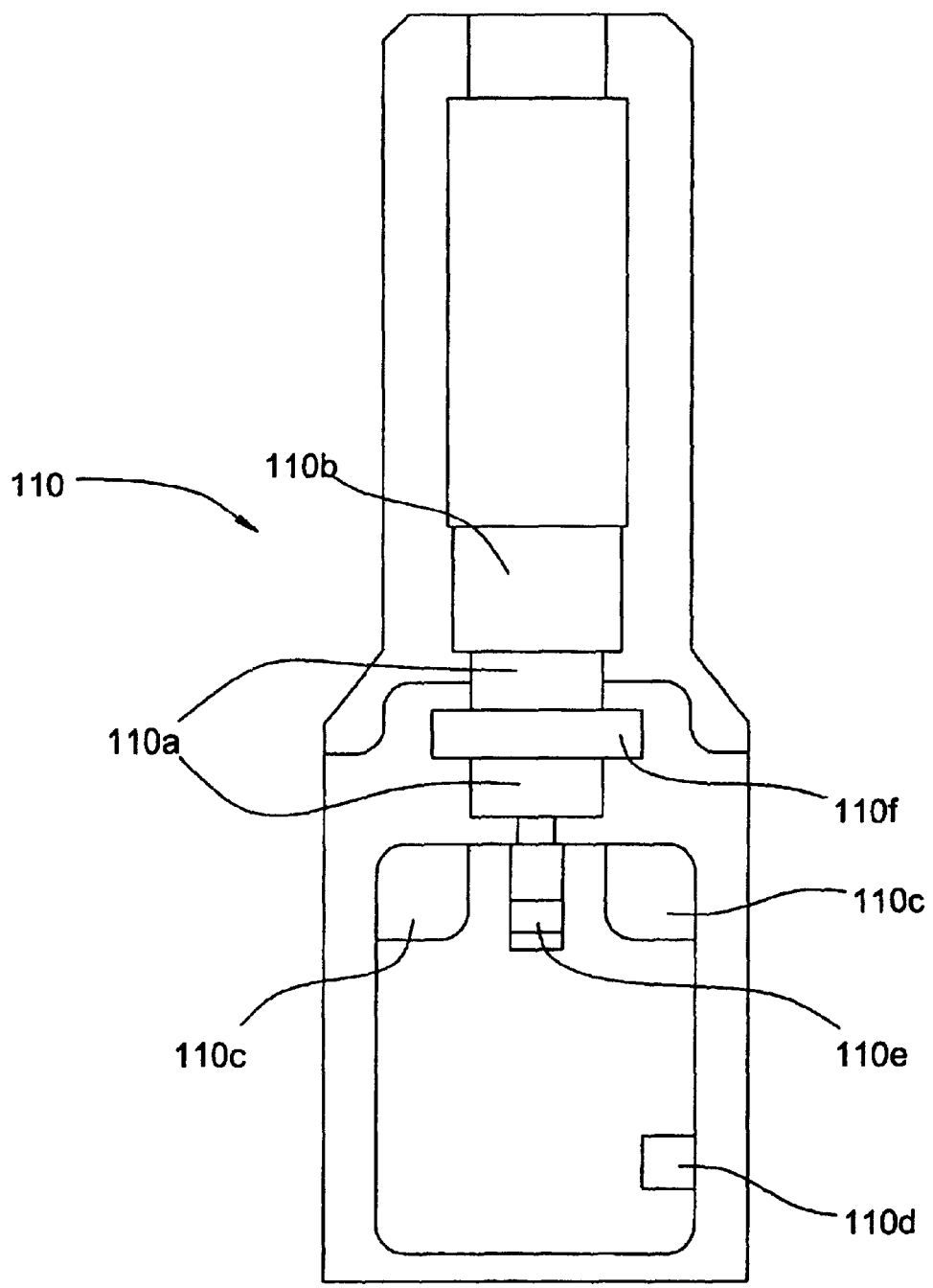
FIGS. 3A–3G are bottom plan views illustrating the construction of an exemplary packaged fiber-coupled optical device.
Figure 3B:
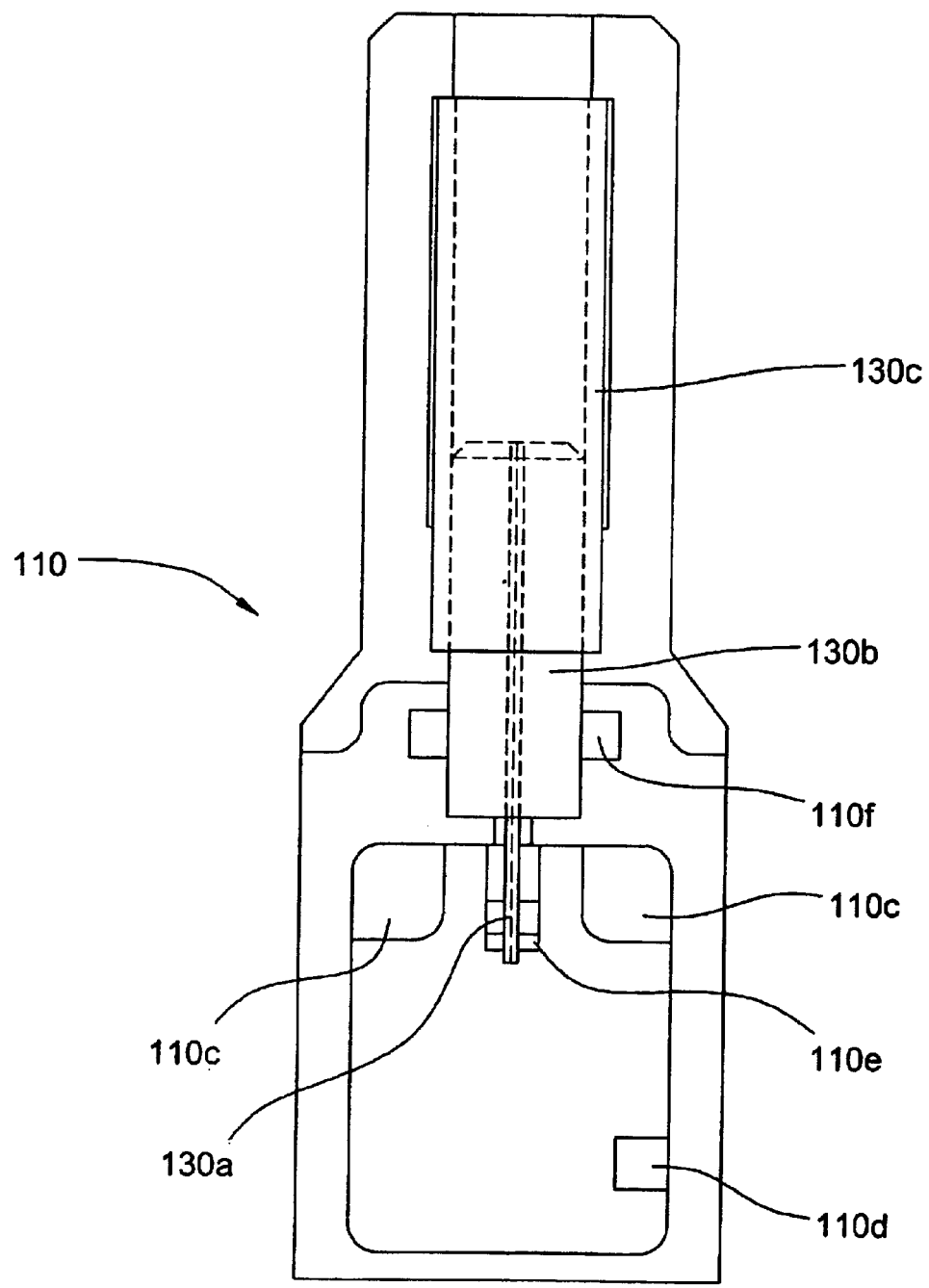
Figure 3C:
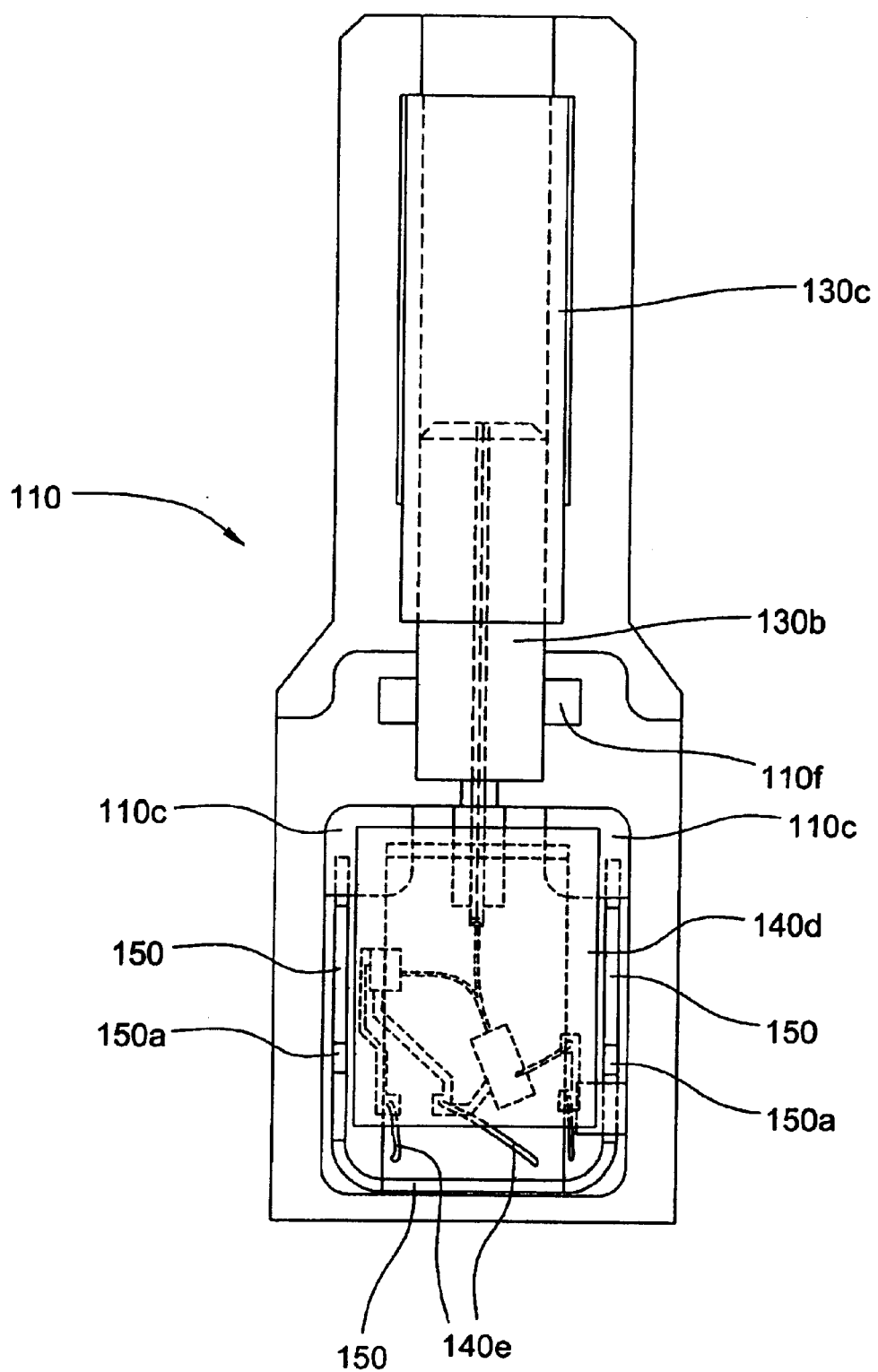
Figure 3D:
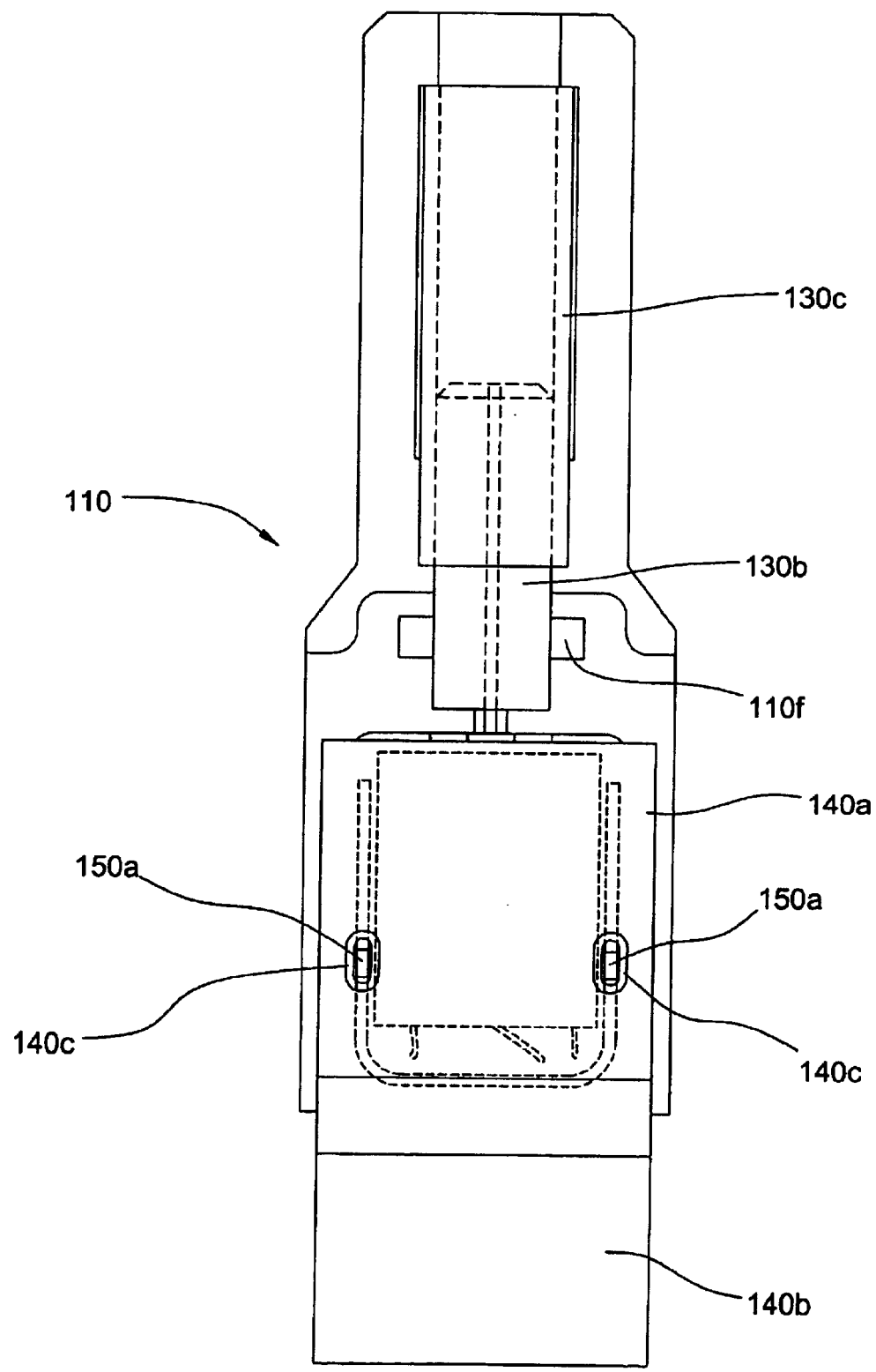
Figure 3E:
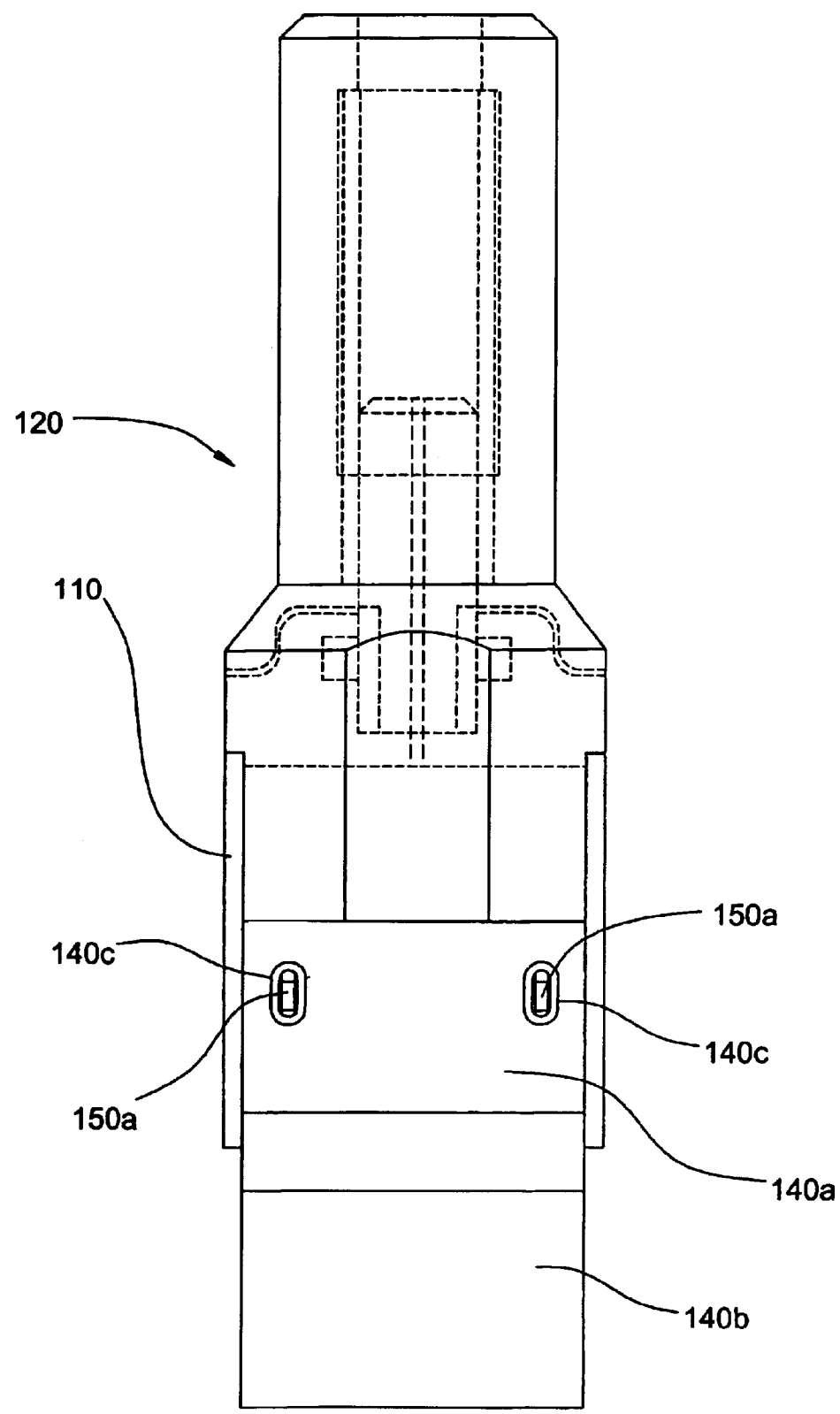
Figure 3F:
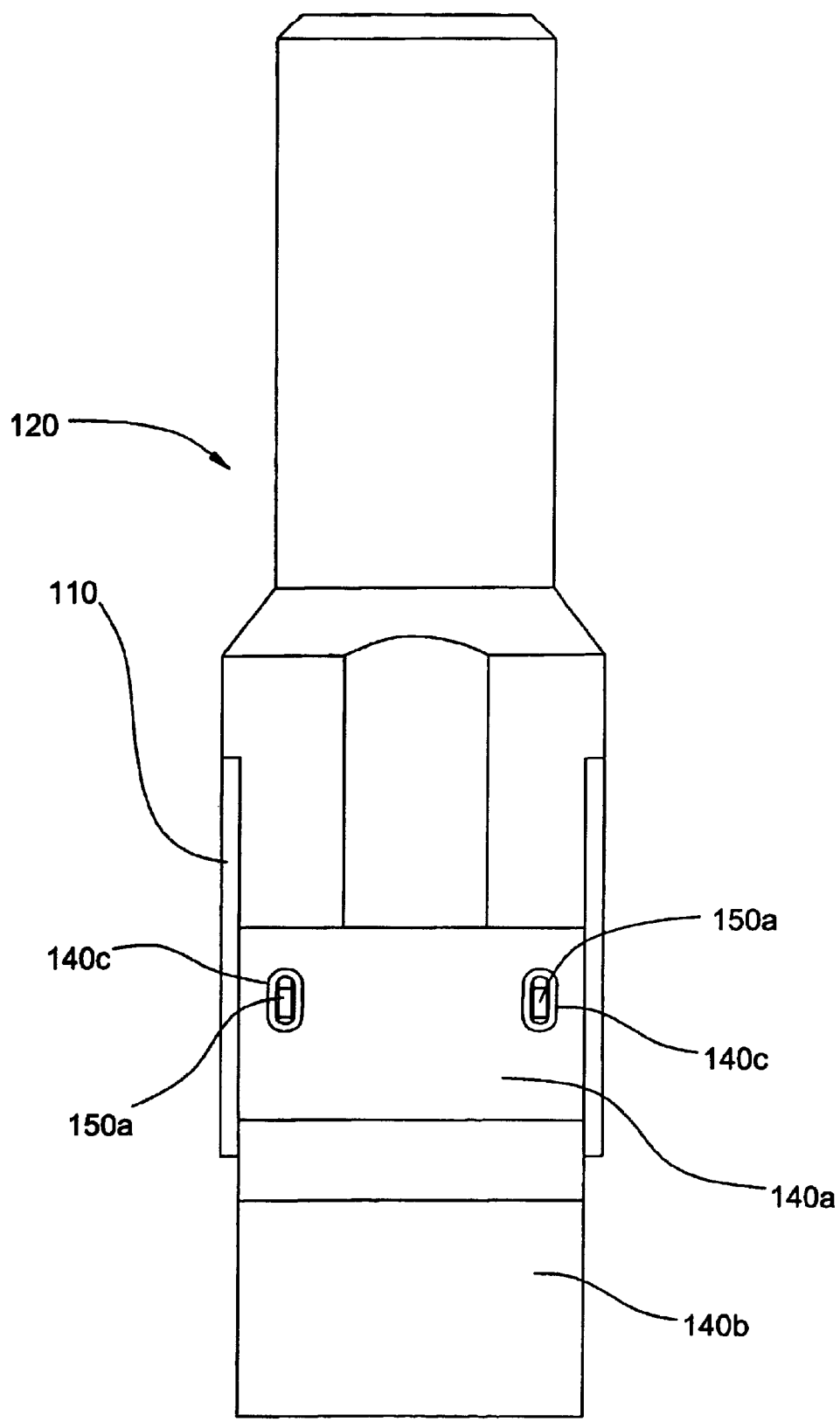
Figure 3G:
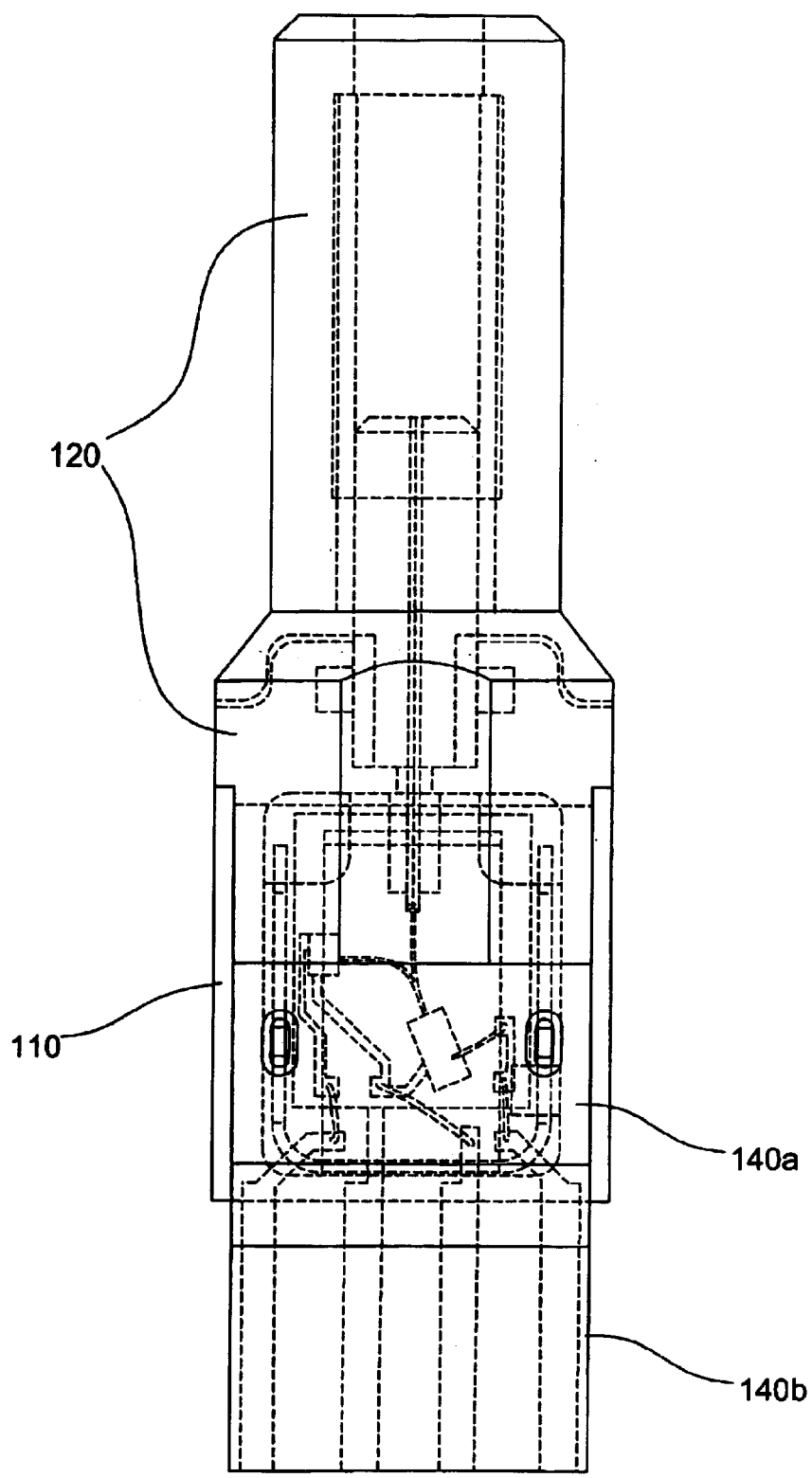

An alignment housing 110 (most clearly illustrated in FIGS. 2A and 3A) is employed for maintaining proper positioning of optical fiber 130a seated in groove 140h. The alignment housing 110 includes mounting surfaces 110a for engaging fiber ferrule 130b, mounting surface 110b for engaging fiber sleeve 130c, and a fiber retainer 110e (a fiber-retaining arm in this exemplary embodiment) for maintaining fiber 130a seated within groove 140h, and may also include mounting surfaces 110c and 110d for engaging device substrate 140d. After insertion of fiber ferrule 130b (with fiber 130a) into sleeve 130c, the fiber subassembly 130 is seated into alignment housing 110 (FIGS. 2B and 3B). Fiber subassembly 130 may be held in place by frictional engagement with alignment housing 110, or may be held in place by use of a suitable adhesive, or by other suitable retention means. Assembly of enclosure housing 120 with alignment housing 110 (discussed further hereinbelow) may serve to retain fiber subassembly 130 engaged with alignment surfaces 110a and/or 110b within alignment housing 110. Fiber retainer 110e is positioned so that when ferrule 130b is engaged with surface 110a, fiber retainer 110e makes contact with the protruding end of fiber 130a and deflects it slightly from its axial position. A transverse deflection between about 5 μm and about 100 μm, typically between about 50 μm and about 60 μm (over a protruding fiber length between about 1 millimeter and about 2 millimeters), is typically employed. Deflections and protruding fiber lengths outside these ranges may be employed within the scope of the present disclosure.

Once the fiber subassembly 130 is positioned within alignment housing 110, the device subassembly 140 is mounted thereon. The device subassembly 140 and alignment housing 110 are positioned horizontally (relative to the orientation of FIG. 1) to align fiber 130a over groove 140h both laterally and longitudinally. Such alignment may be performed manually under visual inspection, using automated positioning equipment with machine vision, or by any other suitable technique(s). Once aligned, the alignment housing 110 and device subassembly are brought together vertically until the device substrate 140d is seated onto alignment surfaces 110c and 110d, which also results in seating of fiber 130a in groove 140h, held there by pressure exerted by fiber retainer 110e (best shown in FIGS. 3C, 4B, 4C, and 5B). Fiber retainer 110e is typically constructed from a material sufficiently resilient to allow vertical displacement without exerting undue pressure on fiber 130a (i.e., without enough pressure to damage the fiber or cause unacceptable distortion of optical signals transmitted therethrough). Mounting surface(s) 110c may be positioned relative to fiber retainer 110e so that upon seating of substrate 140d thereon, fiber 130a seated in groove 140h is forced back into a nearly axial position. The resilience and deflection of fiber retainer 110e allows this to occur, and the resulting pressure exerted by deflected fiber retainer 110e serves to hold the fiber 130a firmly seated within groove 140h. Longitudinal motion of the fiber 130a within groove 140h, particularly longitudinal motion arising from differential rates of thermal expansion, may still occur with fiber retainer 110e holding the fiber 130a seated within the groove 140h. Device subassembly 140 may be held in place on alignment housing 110 by use of a suitable adhesive, by one or more mechanical retainers, or by other suitable retention means. Assembly of enclosure housing 120 with alignment housing 110 (discussed further hereinbelow) may serve to retain device subassembly 140 engaged with alignment surfaces 110c and/or 110d within alignment housing 110.

Alignment housing 110 may be constructed from any one or more suitable material(s). One exemplary embodiment may be integrally molded from plastic or other suitable polymer material. Suitable plastics must be sufficiently rigid to enable accurate positioning of the fiber subassembly 130 and device subassembly 140 against the respective mounting surfaces, and sufficiently resilient for enabling deflection of fiber retainer 110e (if retainer 110e is a retaining arm integrally formed with the alignment housing). Suitable plastics must also enable sufficiently precise molding for forming various mounting surfaces and fiber-retaining arm 110e at the correct positions. Suitable plastics may also be chosen as sufficiently non-hygroscopic, loaded for providing some degree of electromagnetic shielding, and/or for suitable thermal expansion properties relative to other materials employed in the subassemblies and housing. PEEK™ resin (polyetheretherketone) and liquid crystal polymers are among many examples of suitable plastics that could be employed. Instead of fabrication from a single material, alignment housing 110 may be constructed from multiple materials that provide the necessary mechanical characteristics at the desired locations.

In aligning the device subassembly 140 with the alignment housing 110 and fiber subassembly 130, alignment tolerances of about ±10 µm are typically sufficient in all dimensions. Seating of fiber 130a within groove 140h will typically serve to correct any remaining lateral misalignment of the fiber and groove and to sufficiently align the fiber with component(s) on substrate 140d. The resulting lateral deflection of fiber 130a (if any) is typically of a negligible distance (less than about 10 µm). Vertical tolerance of ±10 µm or even ±20 is typically sufficient for vertical positioning of subassembly 140 with respect to retainer 110e and fiber 130a (the resulting deflection of retainer 110e providing sufficient force for stable positioning of fiber 130a within groove 140h while avoiding undue force on fiber 130a). Longitudinal displacement of a few tens of microns, for the mode sizes and wavelengths employed (typical of single-mode optical fiber at typical telecommunications wavelengths, for example), may typically only affect optical coupling between optical fiber 130a and component(s) on substrate 140d within operationally acceptable limits. Tighter or looser alignment tolerances in any or all dimensions may be imposed (within operationally acceptable limits for a particular packaged optical device) while remaining within the scope of the present disclosure and/or appended claims.

Instead of the illustrated arrangement in which mounting surfaces 110c and 110d engage a top surface of device substrate 140d, mounting surfaces 110c and/or 110d may be otherwise configured for engaging top and/or bottom surfaces of device substrate 140d and/or base plate 140a, as long as the engagement results in the desired deflection of retainer 110e as it urges fiber 130a into groove 140h. Instead of relying on mounting surfaces 110c and/or 110d as internal alignment references for vertical positioning subassembly 140 with respect to retainer 110e and fiber 130a, such alignment may instead be performed: manually under visual inspection; using automated positioning equipment with machine vision; by monitoring the vertical position of subassembly 140 relative to fiber 130a and/or retainer 110e; by monitoring the deflection of fiber 130a; by monitoring the force on retainer 110e and/or on subassembly 140; and/or by any other suitable technique(s). Once positioned, device subassembly 140 is secured in place within alignment housing 110 using a suitable adhesive or by other suitable securing means. If thus aligned and secured within alignment housing 110, alignment surfaces 110c and 110d may be omitted, and the size of substrate 140d and/or base plate 140a may be correspondingly reduced.

Figure 4A:
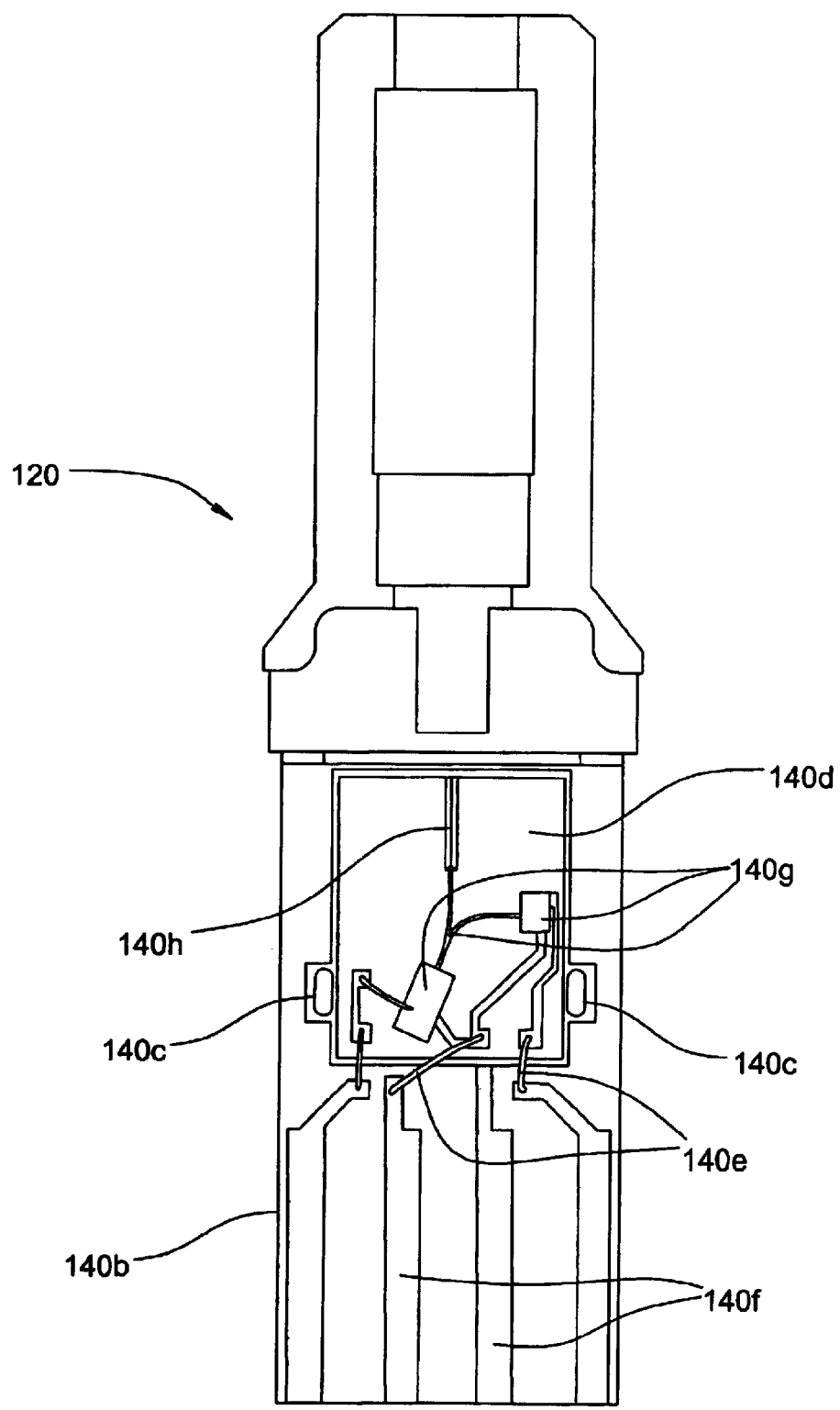
FIGS. 4A–4E are top plan views illustrating the construction of an exemplary packaged fiber-coupled optical device.
Figure 4B:
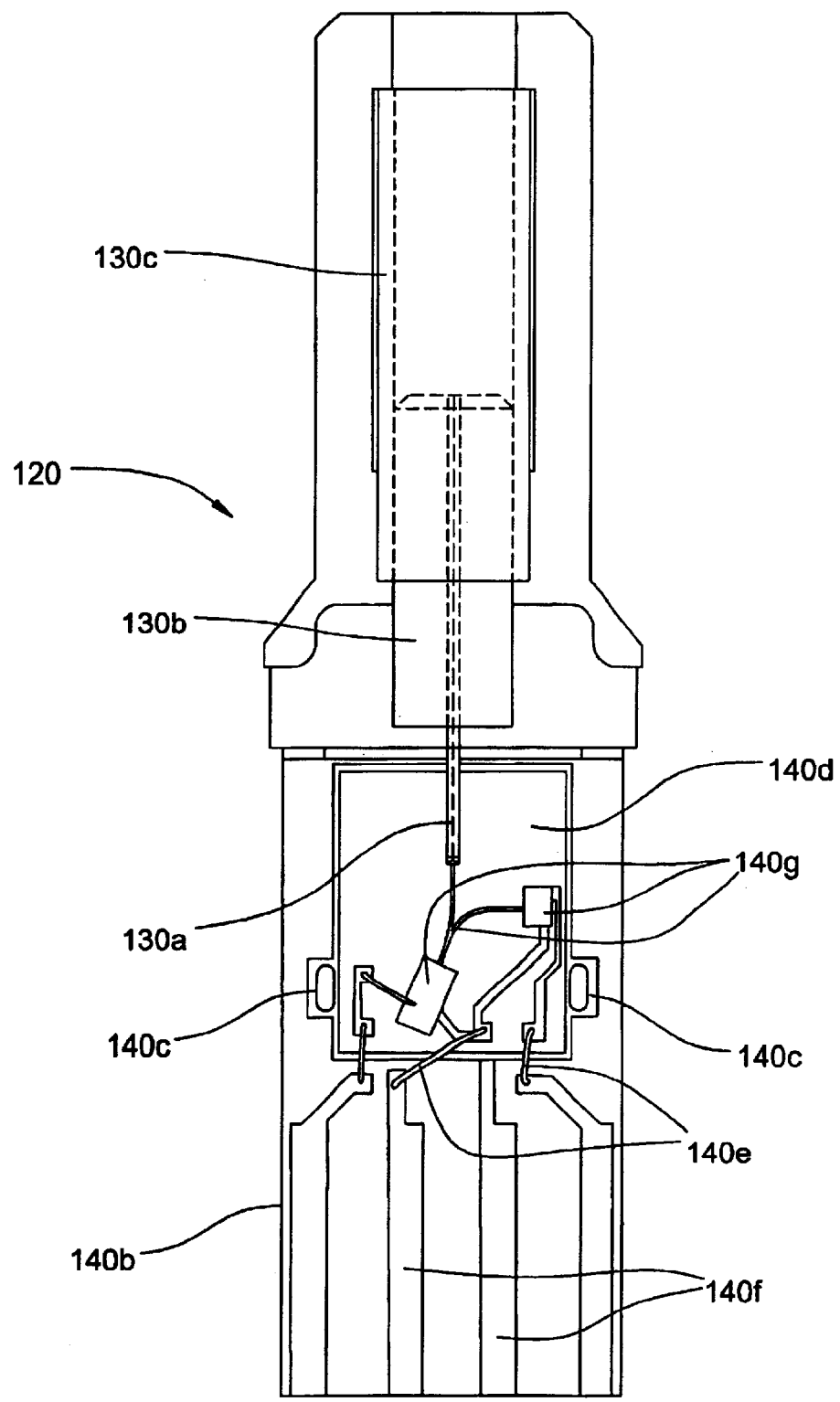
Figure 4C:
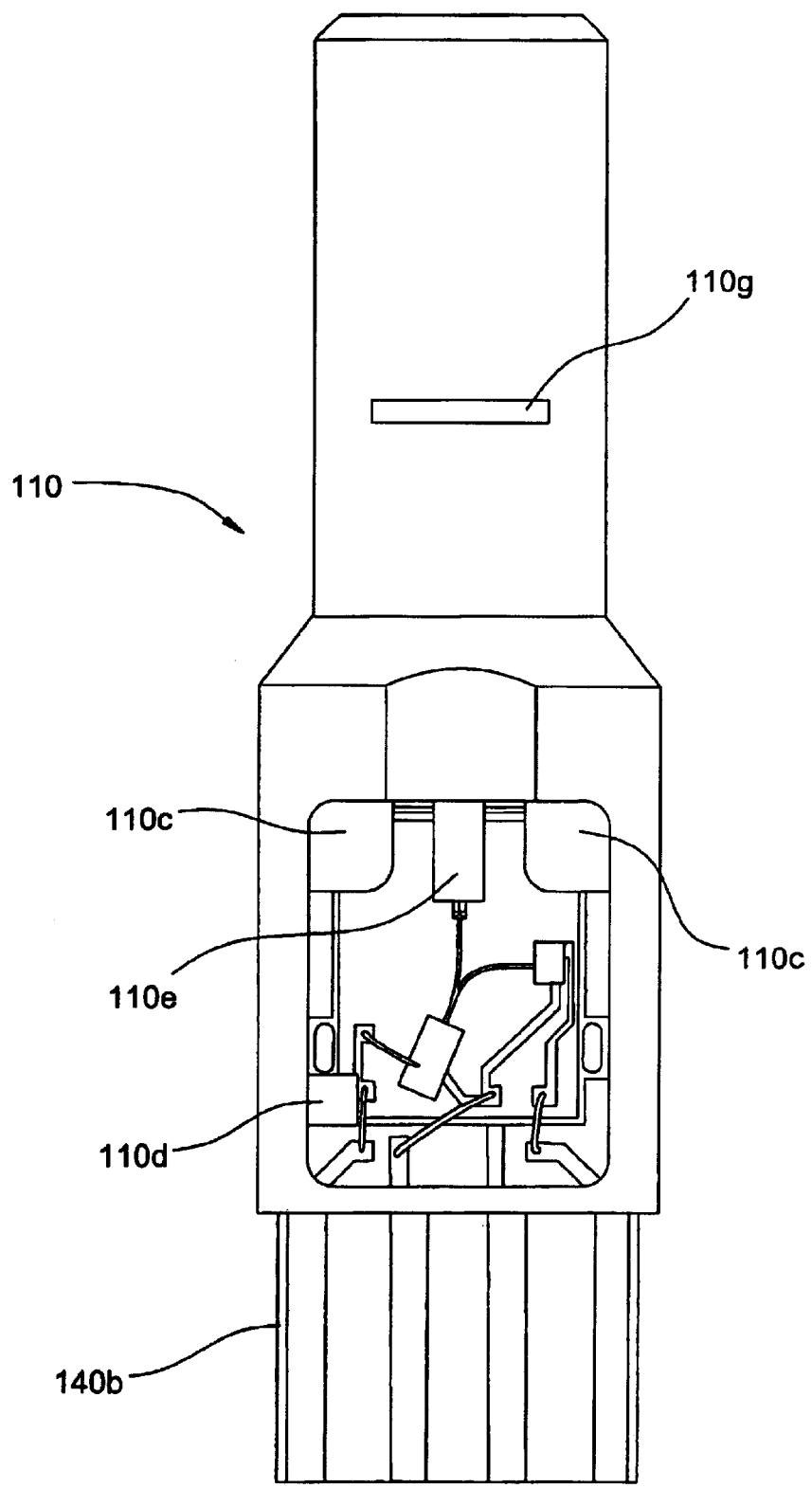
Figure 4D:
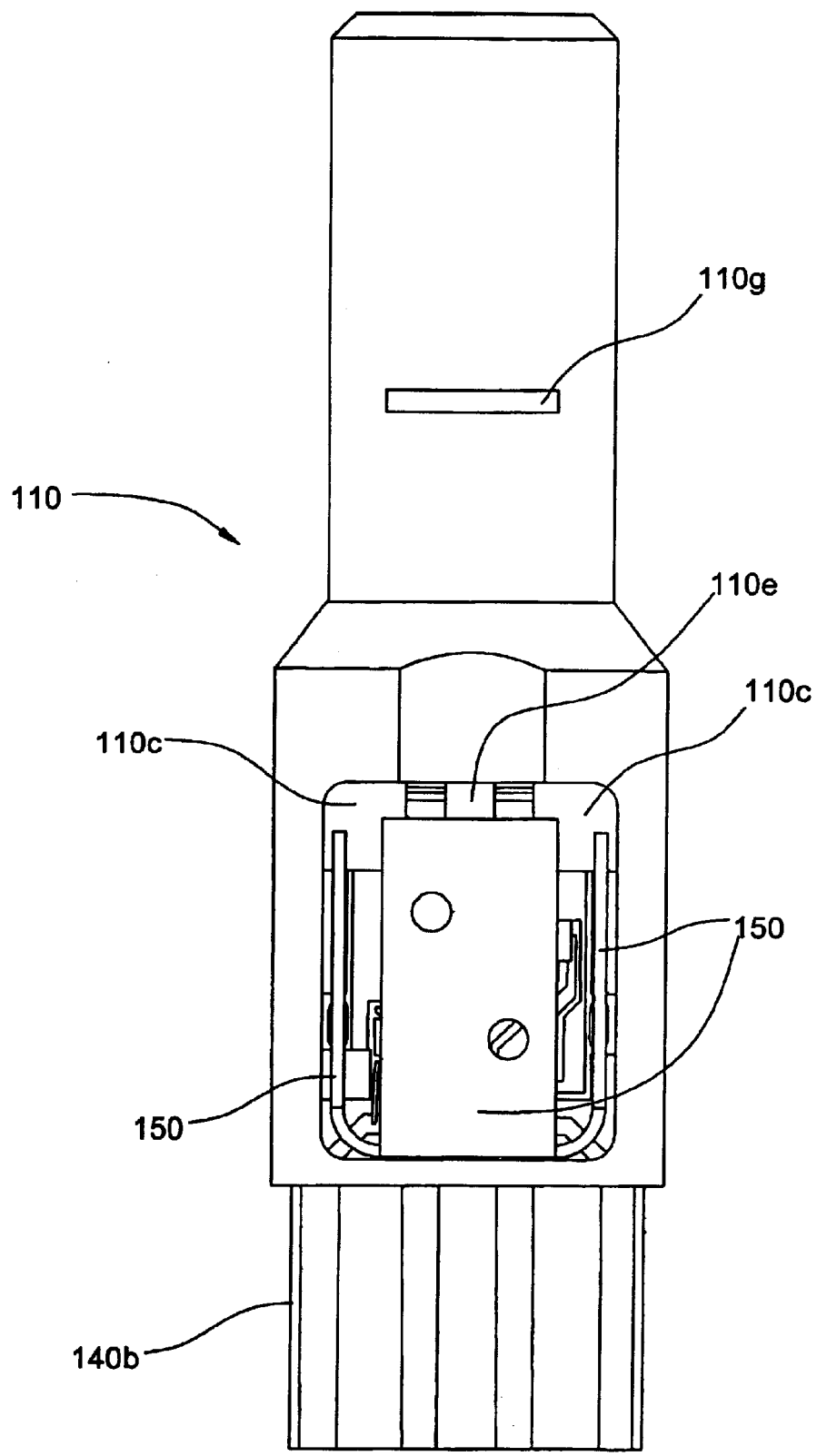
Figure 4E:
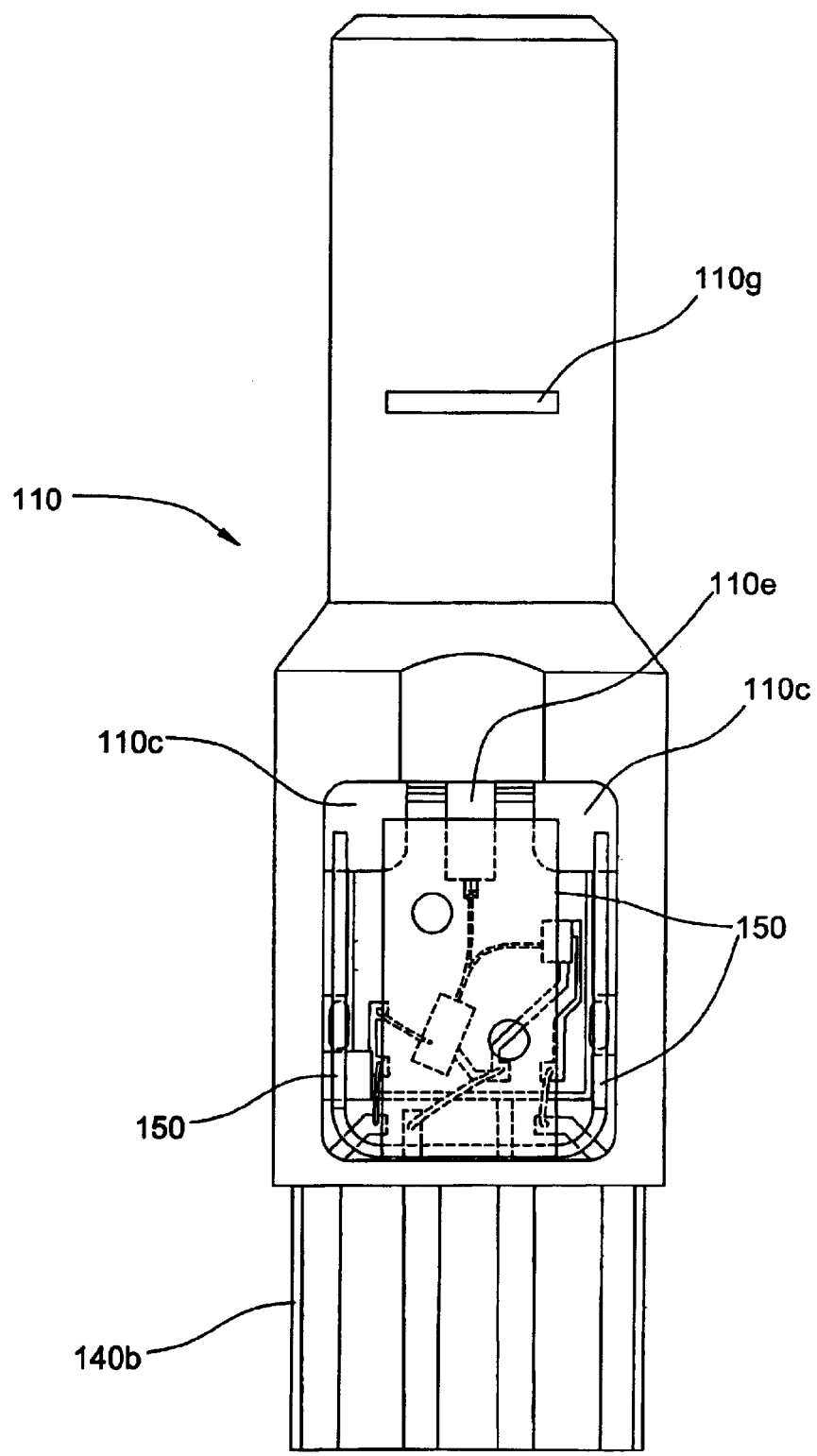
Figure 5A:
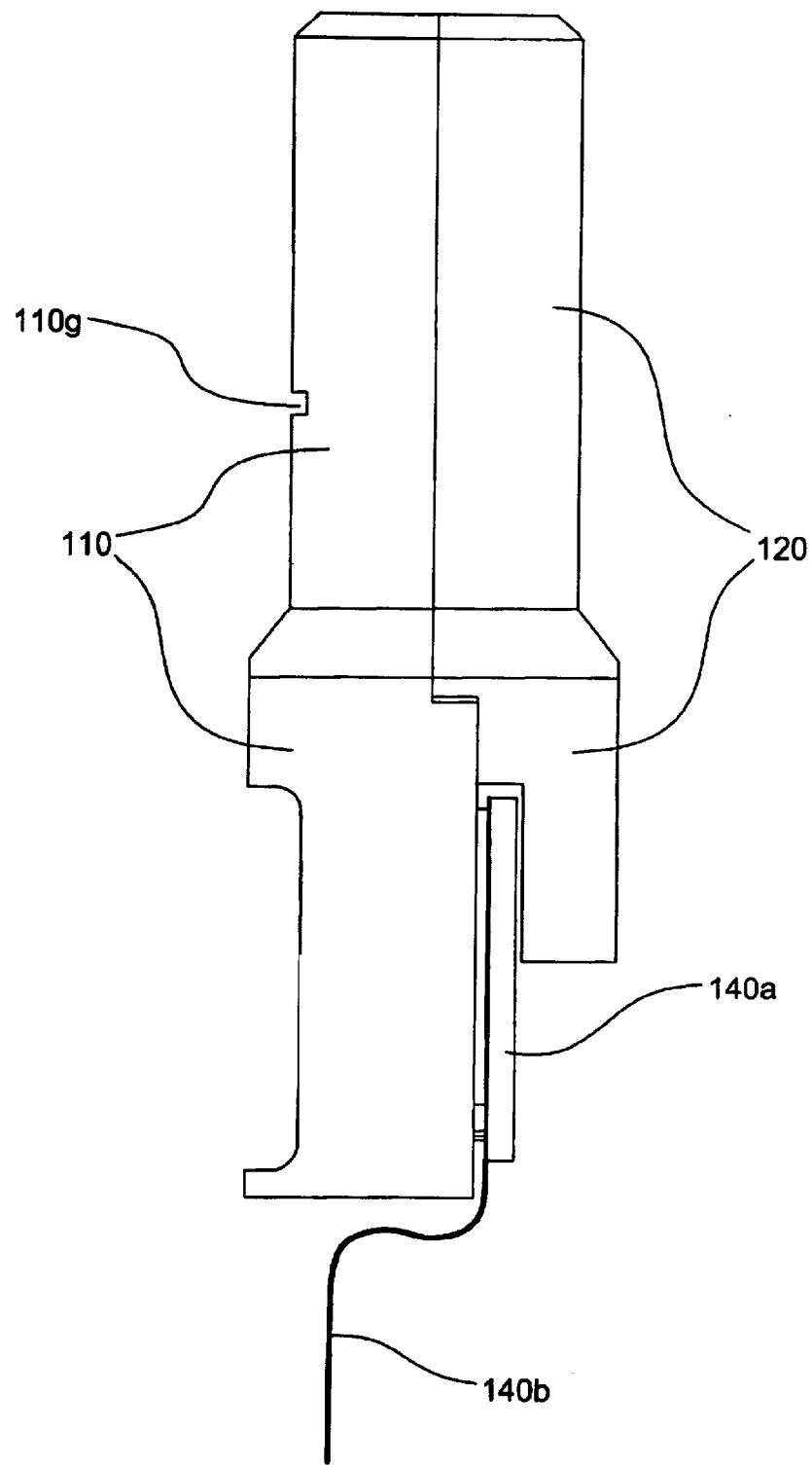
FIGS. 5A–5B are side views of an exemplary packaged fiber-coupled optical device.
Figure 5B:
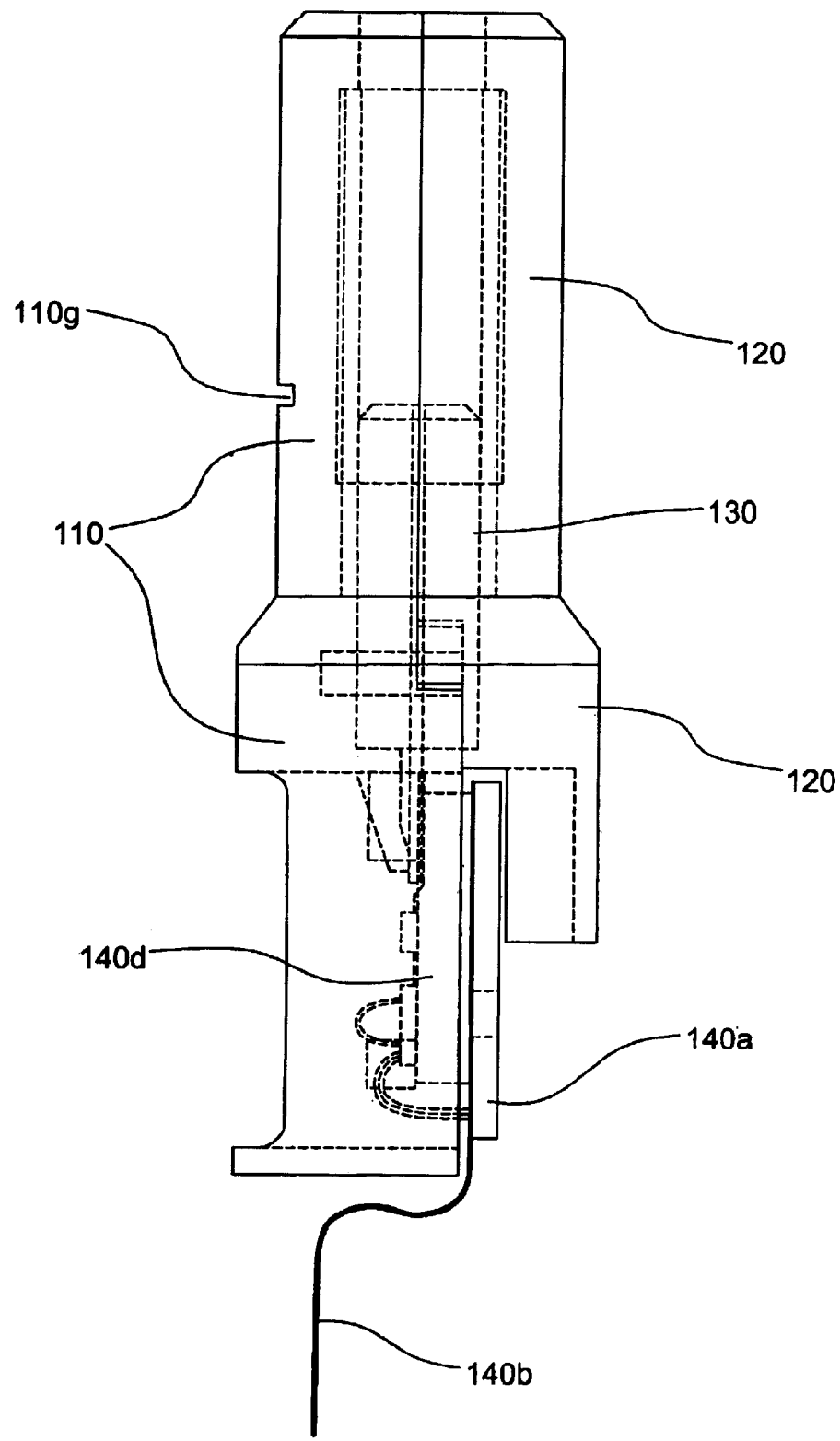
Figure 10A:
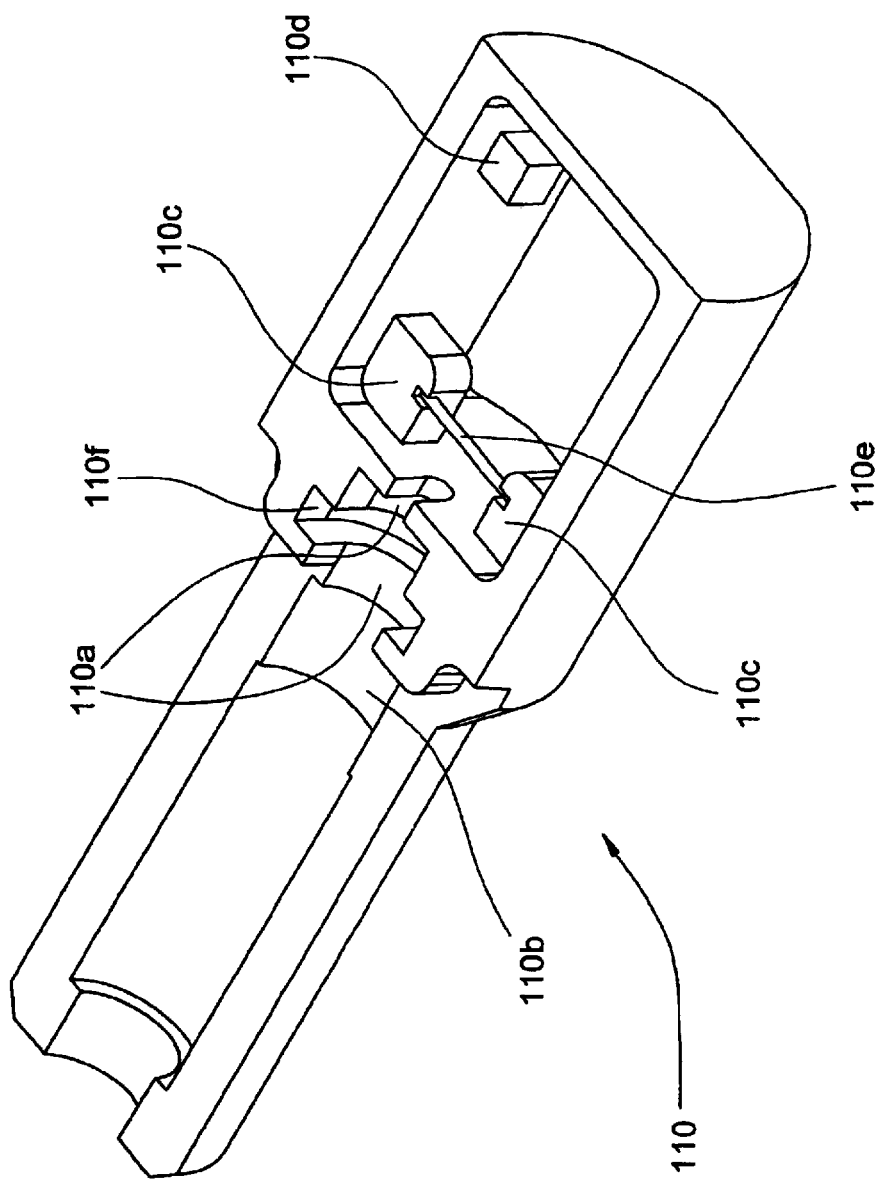
FIGS. 10A–10B are perspective views from below illustrating the construction of an exemplary packaged fiber-coupled optical device.
Figure 10B:
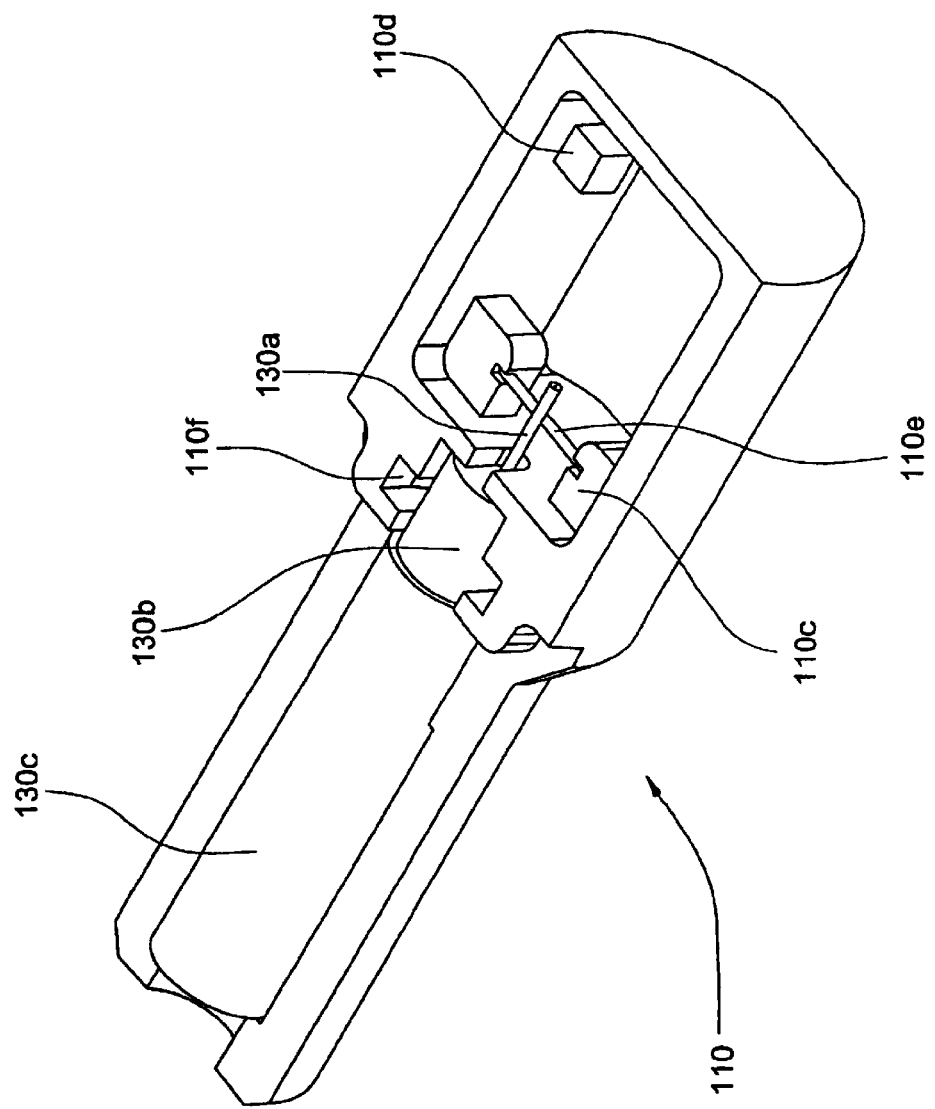
Figure 11A:
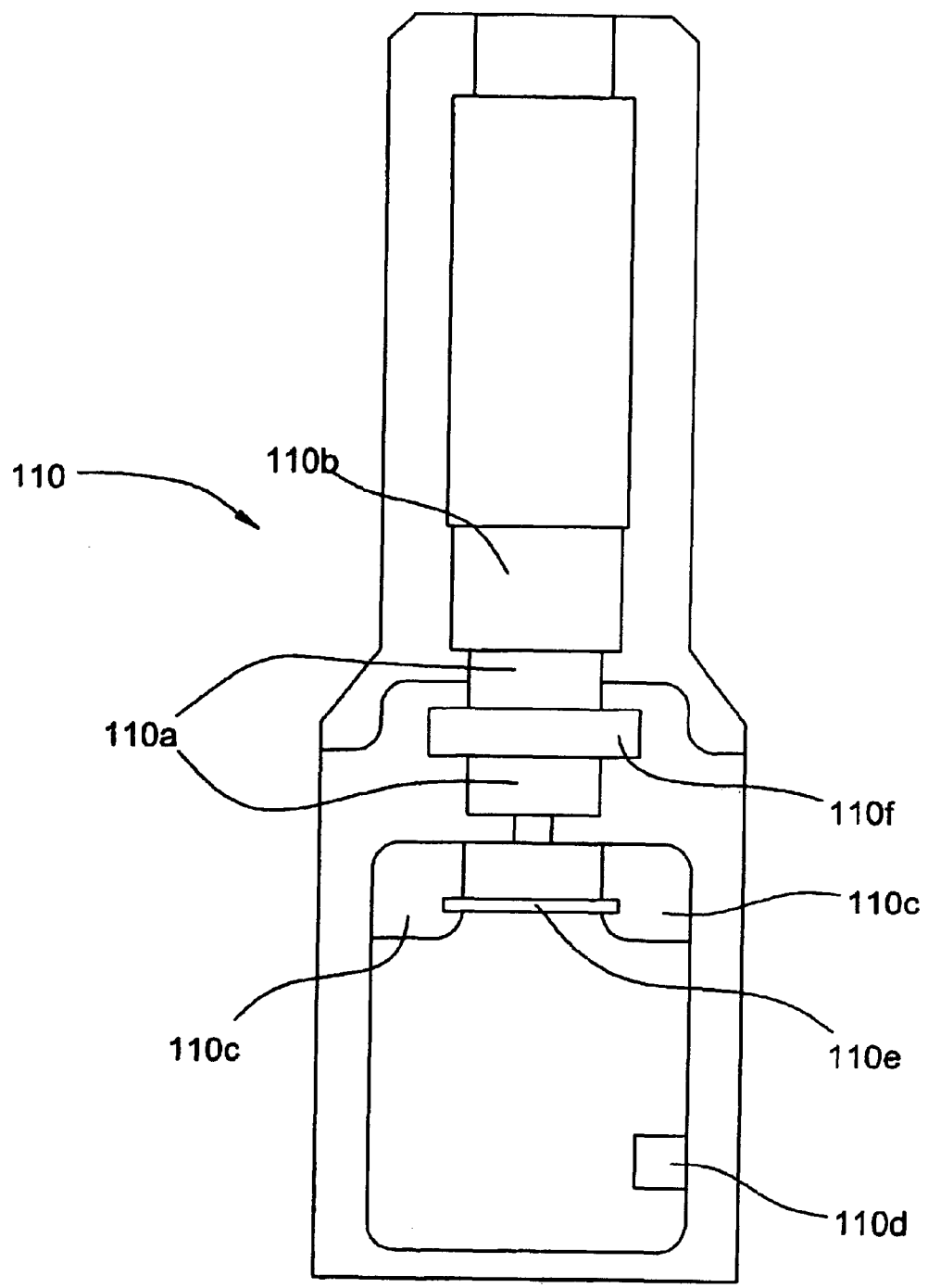
FIGS. 11A–11B are bottom plan views illustrating the construction of the exemplary packaged fiber-coupled optical device.
Figure 11B:
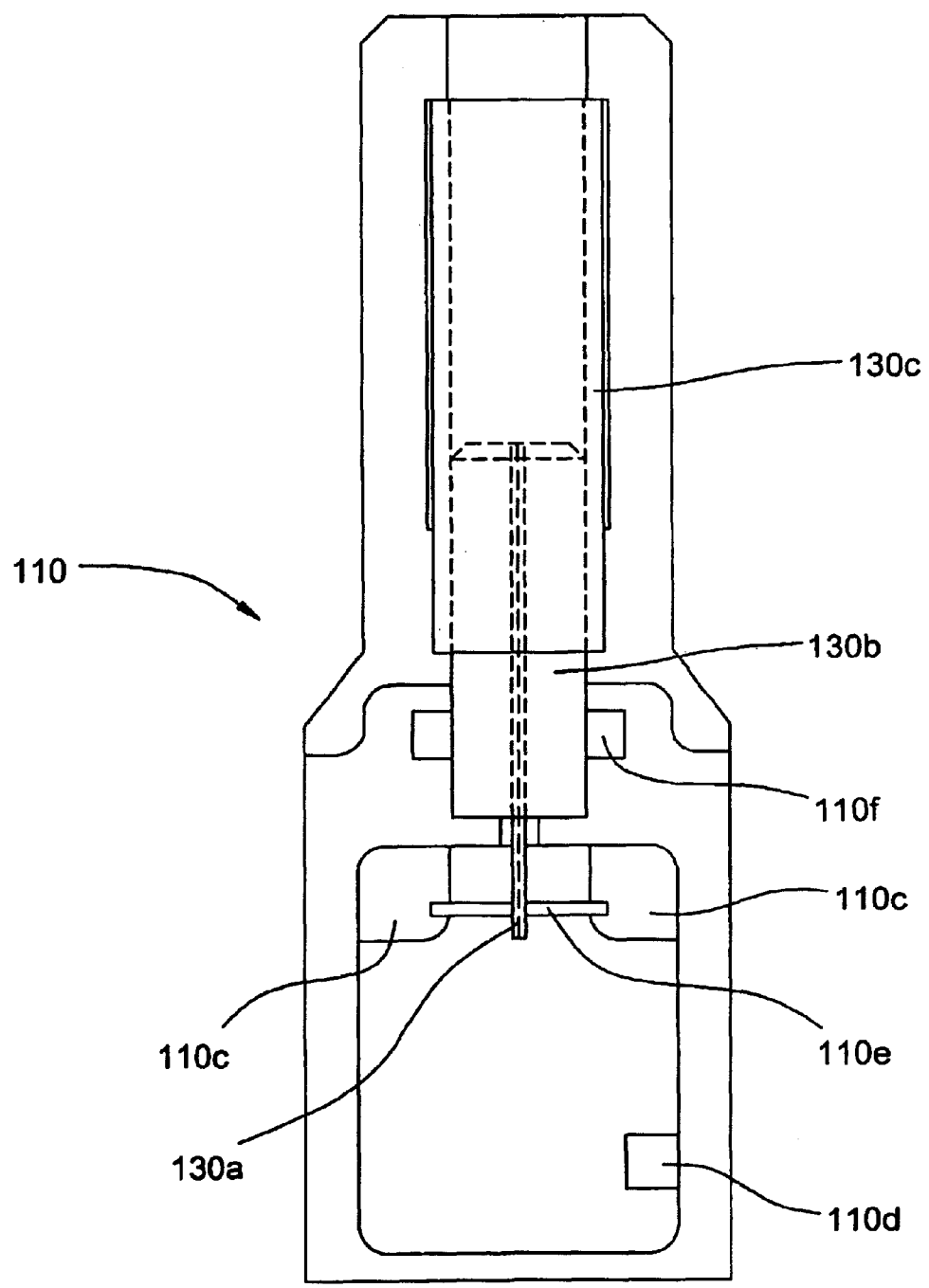
Figure 12:
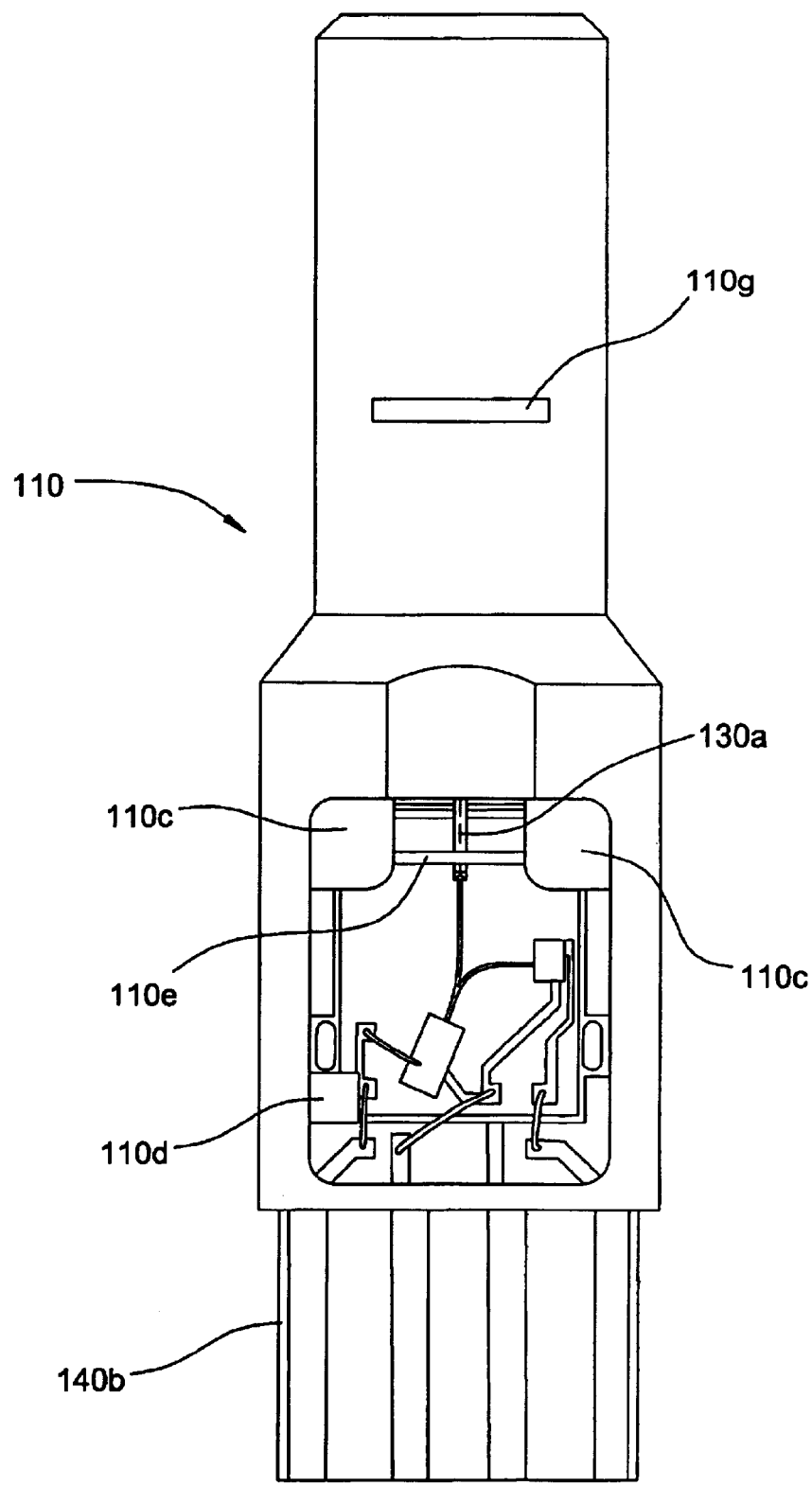
FIG. 12 is a top plan view illustrating the construction of the exemplary packaged fiber-coupled optical device.

An alternative configuration for fiber retainer 110e is shown in FIGS. 10A–10B (analogous to FIGS. 2A–2B), FIGS. 11A–11C (analogous to FIGS. 3A–3B), and FIG. 12 (analogous to FIG. 4C). Instead of a fiber-retaining arm as in the previous exemplary embodiment, fiber retainer 110e comprises a fiber-retaining cross member positioned across the first end of fiber segment 130a. Upon assembling the device subassembly 140 with the alignment housing 110, the fiber-retaining cross member 110e urges the fiber segment 130a into fiber groove 140h. The fiber-retaining cross member may be assembled with the alignment housing with each end of the cross-member received in a corresponding groove in the alignment housing. The fiber-retaining cross member may comprise a suitably resilient material, so as to allow some degree of vertical displacement of fiber segment 130a without exerting undue pressure on the fiber. The fiber-retaining cross member may comprise a material different from the alignment housing material. A short length of thin metal wire may be employed as the fiber-retaining cross member. Such a metal wire fiber-retaining cross-member may be between about 100 µm and about 300 µm in diameter, and between about 2 mm and about 4 mm in length. Dimensions outside these ranges may be employed as well. Suitable materials may include stainless steel, tempered steel, phosphor bronze, or any other suitable spring material. Alternatively, non-metallic resilient materials may be employed, including but not limited to plastics and/or polymer materials. Instead of assembling the fiber-retaining cross member with the alignment housing, the fiber-retaining cross member may be integrally formed with the alignment housing from a common material (subject to considerations similar to those described hereinabove for an integrally formed fiber-retaining arm). In the FIGS. 10A–10B, 11A–11B, and 12, the slots receiving the ends of fiber retainer 110e are positioned near the alignment surfaces 110c. A fiber-retaining cross member may also be used in embodiments that do not necessarily include alignment surfaces 110c and/or 110d, as described above for a fiber-retaining arm. The slots or other suitable structure(s) for receiving the ends of the fiber-retaining cross member may be placed in any suitable location on alignment housing 110.

An electromagnetic shield 150 may be assembled onto device subassembly 140 within alignment housing 110. Such a shield may reduce electromagnetic interference from a use environment that may be picked up by electrical traces on substrate 140d, by wire leads 140e, and/or by one or more of components 140g, and may also reduce emission of electromagnetic interference by one or more of those elements. In the exemplary embodiment, shield 150 includes tabs 150a that are inserted into corresponding slots 140c in base plate 140a of device subassembly 140. Base plate 140a may also provide a portion of the electromagnetic shielding, and tabs 150a and slots 140c may serve to establish electrical continuity between shield 150 and base plate 140a. Alignment housing 110 and/or enclosure housing 120 (see below) may also be adapted for providing some degree of electromagnetic shielding.

Enclosure housing 120 is assembled onto alignment housing 110 and serves to retain fiber subassembly 130 and device subassembly 140 engaged with alignment housing 110 (possibly in addition to any adhesive, solder, and/or other retention means that might also be employed). Alignment housing 110 and enclosure housing 120 may be provided with one or more sets of structures for assembly (not shown). Such structures may include but are not limited to: tabs and mating slots, pins and mating holes, clips, clamps, detents, press-fit members, heat stakes, rivets, other suitable assembly structures, combinations thereof, and/or functional equivalents thereof. Alignment housing 110 and enclosure housing 120 may be secured together using a suitable adhesive, by engagement of suitable mechanical structures (including those listed above), by ultrasonic welding, and/or by other suitable means. It may be the case that enclosure housing 120 provides no alignment function, and fabrication thereof need not be kept within tolerances as tight as those employed for alignment housing 110. On the other hand, it may be advantageous in some instances for enclosure housing 120 to provide some degree of alignment function. If so, fabrication tolerances therefor would be similar to those for fabricating alignment housing 110.

Alignment housing 110 is shown with a slot 110f between ferrule mounting surfaces 110a. A corresponding groove (not shown) may be provided on fiber ferrule 130*b*. The bottom surface of the ferrule slot may form a chord across the circular cross-section of the ferrule, or the ferrule slot may be otherwise configured so as not to be cylindrically symmetric. After assembly of the fiber subassembly 130 within the alignment housing 110, a pin or similar mechanical member may be engaged within the asymmetric ferrule slot and slot 110*f*, thereby longitudinally retaining the ferrule 130*b* within the alignment housing 110, and restricting or substantially preventing rotation of the ferrule 130*b* within the alignment housing 110. Alternatively, epoxy or other polymer precursor(s) may be deposited within the asymmetric ferrule slot and slot 110*f*, which upon curing may function both as an adhesive and as a mechanical member inserted into the slots. If a slot 110*f* and corresponding slot on the ferrule 130*b* are not provided, the ferrule mounting surfaces 110*a* may form a single contiguous surface.

Once fiber 130*a* is aligned and seated in groove 140*h* and retained therein by retainer 110*e*, a suitable encapsulant may be applied over the end of the fiber and over the corresponding coupled end of component(s) on substrate 140*h*. Such encapsulant may be an index matching gel, for example, to reduce reflective loss and/or feedback. The encapsulant may be cured to form a mechanical/chemical/moisture barrier (instead of or in addition to providing index-matching), and as such may be applied over a greater portion of device substrate 140*d*, if desired. Such an encapsulant may fill some or all of the volume within electromagnetic shield 150 if desired. Alternatively, a first encapsulant may be employed on the substrate 140*d*, and then a second encapsulant may be employed for filling some or all of the volume within shield 150. Holes in shield 150 may facilitate application of encapsulant for filling the volume within the shield.

Exterior portions of alignment housing 110 and/or enclosure housing 120 may be configured for facilitating optical connection of the packaged optical device, and/or for incorporation of the packaged optical device into an optical system or subsystem. For example, alignment and/or engagement structures or members may be formed on the exterior of alignment housing 110 and/or enclosure housing 120 for mounting into another unit, such as an optical switching unit or junction box. Such a unit may include, for example, sockets for receiving packaged optical devices and facilitating their connection to mating connectors. One or both of housings 110 and 120 may include an external reference structure or surface indexed to a position of a component or subassembly inside the packaged device. For example, in a packaged device with a ferrule-type connector it may be desirable to provide an external reference surface indexed to the second end of the fiber ferrule 130*b* (slot 110*g* in FIGS. 4C–4E and 5A–5B), for aiding in the proper assembly of the packaged device with a mating ferrule-type connector. External reference structures or surfaces indexed to another internal component or subassembly may be equivalently employed.

Figure 6:
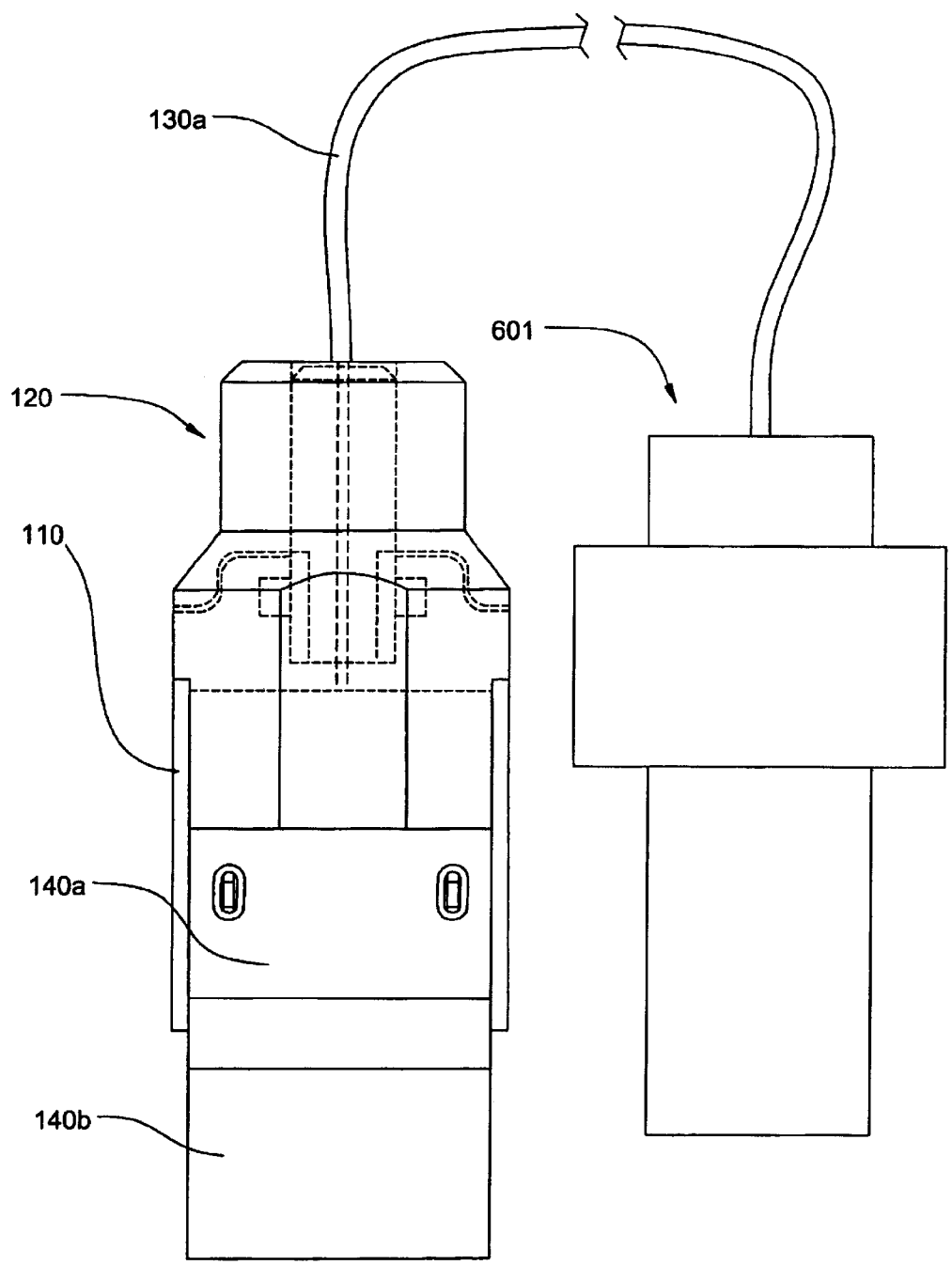
FIG. 6 is a bottom plan views of an exemplary packaged fiber-coupled optical device.
Figure 7:
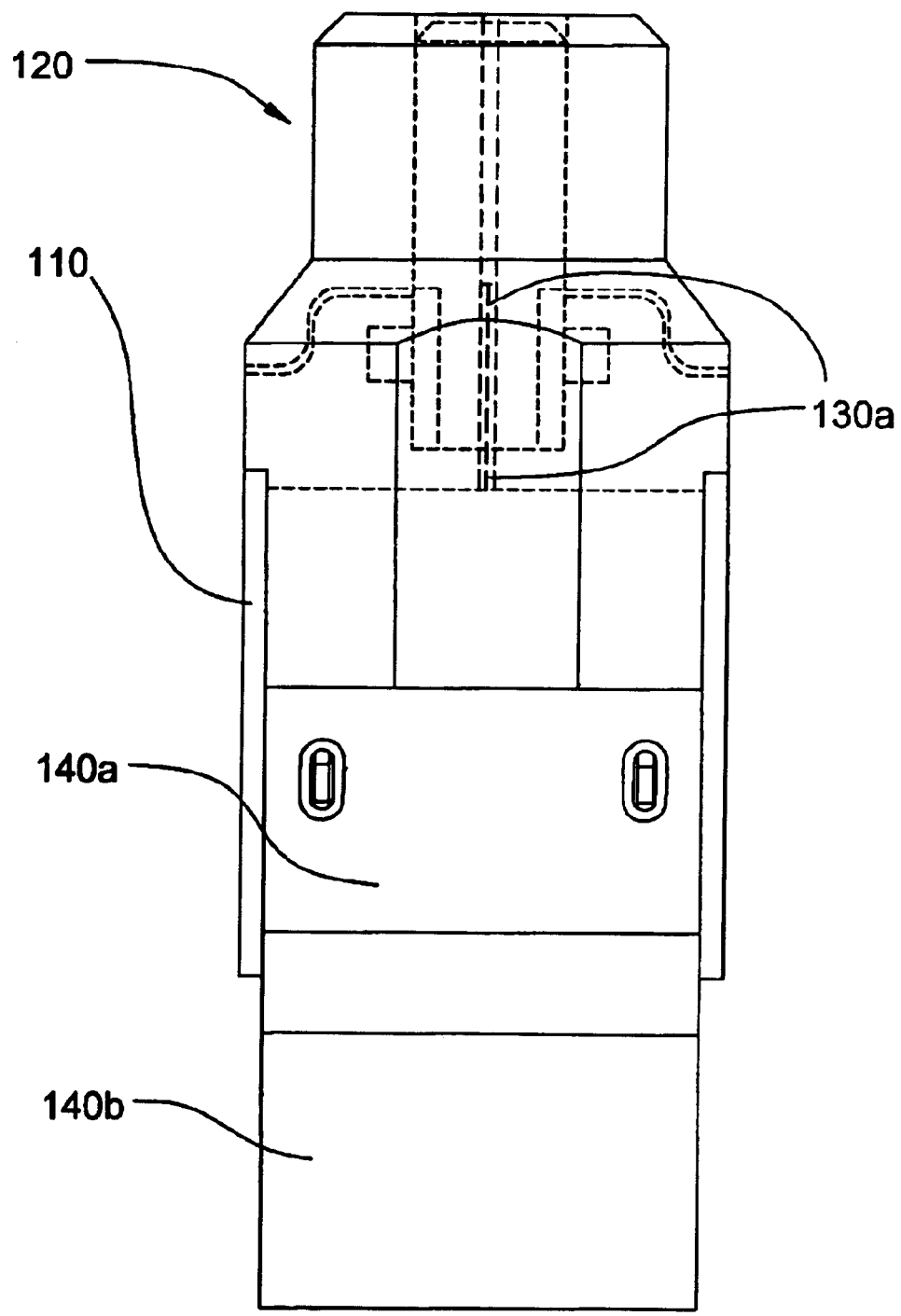
FIG. 7 is a bottom plan view of an exemplary packaged fiber-coupled optical device.
Figure 8:
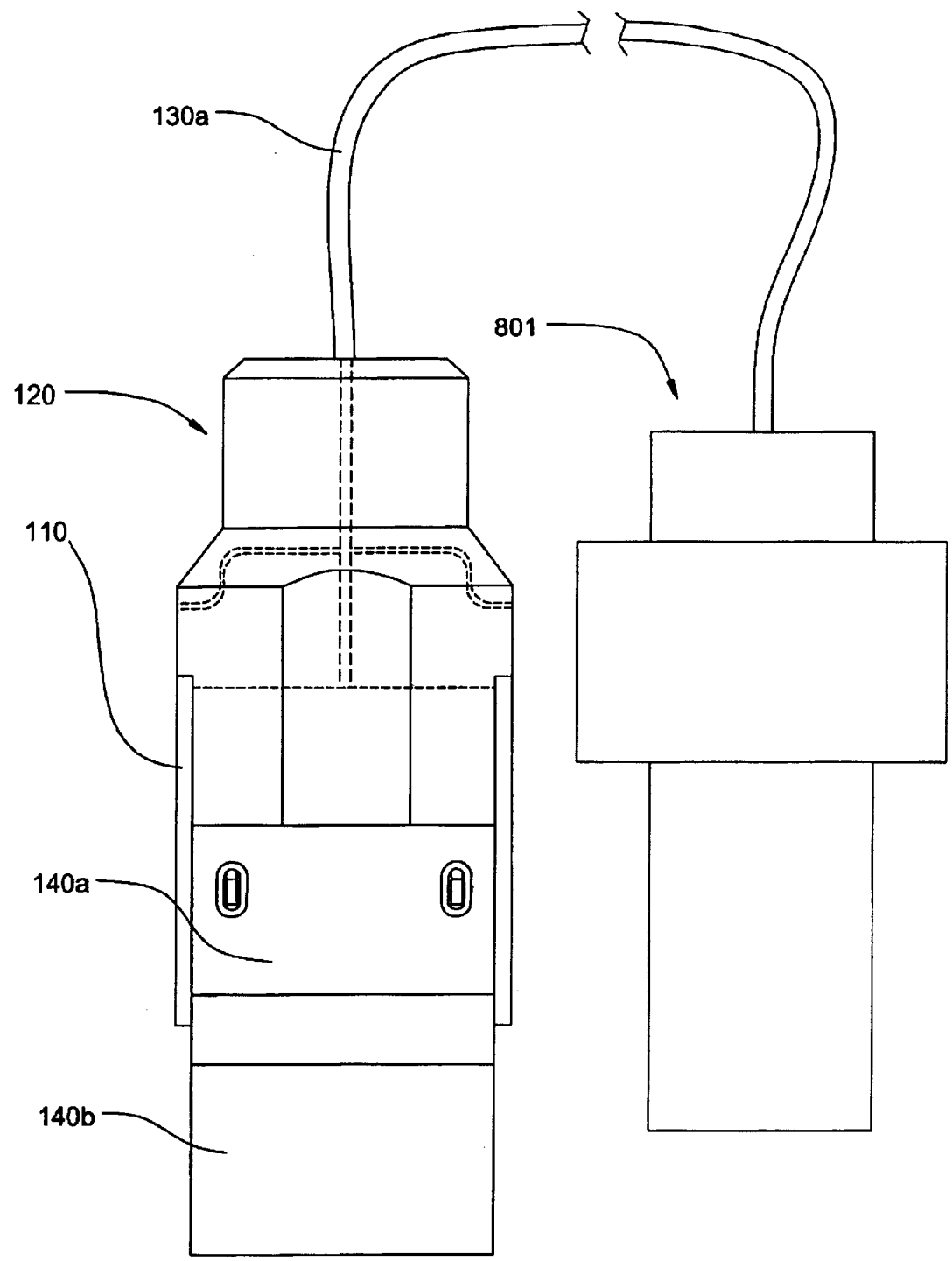
FIG. 8 is a bottom plan view of an exemplary packaged fiber-coupled optical device.

While a specific exemplary embodiment is shown in the Figures, various modifications may be made while remaining within the scope of the present disclosure and/or appended claims. For example, while alignment housing 110, enclosure housing 120, and fiber sleeve 130*c* together form a ferrule-type fiber-optic connector in the exemplary embodiment of the Figures, they may instead be configured so as to form any other suitable type of fiber-optic connector. For example, embodiments may be constructed without use of a fiber sleeve 130*c*, and the fiber subassembly 130, alignment housing 110, and/or enclosure housing 120 may instead be configured for forming a fiber-optic connector (for engaging a mating connector). In other examples, embodiments may be constructed wherein the second end of fiber 130*a* protrudes from the corresponding end of ferrule 130*b*, thereby forming a fiber pigtail (FIG. 6). This pigtail (which may be a few millimeters to a few meters in length) may be left free for splicing with another optical fiber (typically fusion splicing), or may be provided with a fiber-optic connector 601 of any suitable type at the protruding second end (as in FIG. 6). Fiber sleeve 130*c* may or may not be present in such pigtailed embodiments. In other examples, embodiments may be constructed wherein the second end of fiber 130*a* terminates before reaching the corresponding end of ferrule 130*a* (as in FIG. 7). Another fiber may be inserted into this end of ferrule 130*b* (typically with a suitable index-matching material) until it butts up against the second end of fiber 130*a*, thereby forming a so-called mechanical splice. Fiber sleeve 130*c* may or may not be present in such mechanically spliced embodiments. In other examples, fiber sleeve 130*c* and fiber ferrule 130*b* may be omitted, with fiber 130*a* secured directly to the alignment housing with its first end against the fiber retainer 110*e* and its second end protruding from the alignment housing, without a connecter and available for splicing, or with a suitable connector 801 (as in FIG. 8). In other examples, embodiments may be constructed using any suitable cable, circuit, flexible circuit, and/or other suitable electrical connection to the device subassembly.

Figure 9:
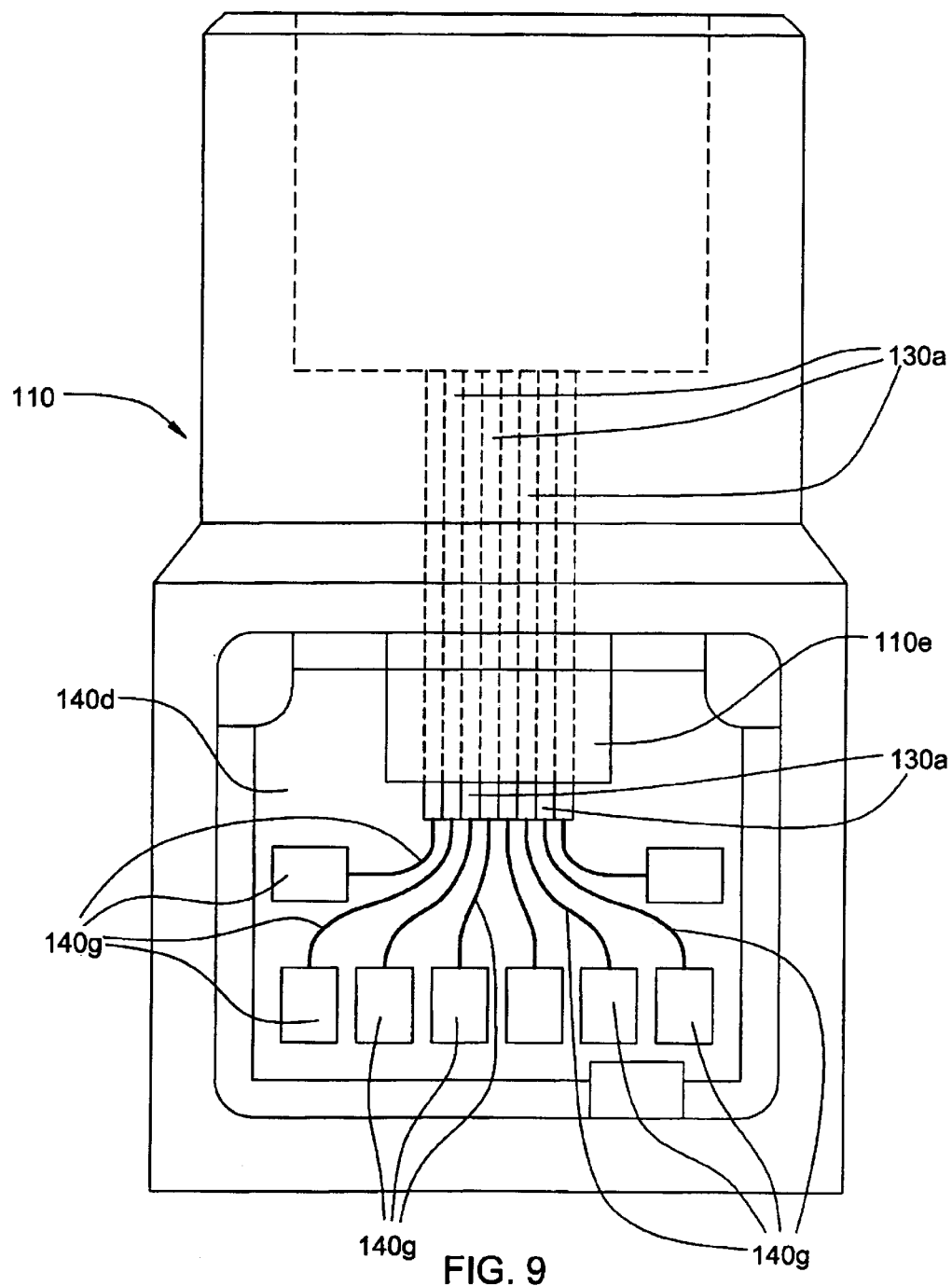
FIG. 9 is a top plan view of an exemplary packaged fiber-coupled optical device.

In other examples, embodiments may be constructed employing multiple fibers 130*a*, each independently coupled to multiple corresponding optical components 140*g*. The multiple components 140*g* may be provided on a common substrate 140*d* with a corresponding groove thereon for each fiber 130*a* and corresponding coupled component 140*g* (as in FIG. 9). Alternatively, coupled optical components and corresponding grooves may be provided on multiple separate device substrates. Alignment housing 110 is suitably configured for relative positioning of fibers 130*a* and substrate(s) 140*d* (including retainer 110*e* to urge the fibers 130*a* into corresponding grooves), as described hereinabove. An alignment housing and/or an enclosure housing are suitably configured for engaging a mating multi-fiber connector, with optical fibers thereof optically coupled to fibers 130*a* (FIG. 9). Alternatively, the multiple fibers may protrude from the packaged device to form fiber pigtails (for splicing, with a multi-fiber connector, or with multiple connectors) as described above.

In the exemplary embodiment of the Figures, optical components 140*g* may include a semiconductor laser, a monitor photodiode, and planar waveguides on the substrate 140*d* to convey optical power between the components and the fiber 130*a* positioned in groove 140*h*. Myriad other combinations of optical components (including but not limited to lasers, LEDs, photodetectors, optical modulators, optical filters, and so forth) may be placed on substrate 140*d*, with one or more of them coupled to the optical fiber 130*a* seated in groove 140*h*, while remaining within the scope of the present disclosure and/or the appended claims. Any encapsulant applied to substrate 140*d* over the end of fiber 130*a* may also be employed to encapsulate and secure one or more of component(s) 140*g* as well, if needed or desired.

Optical components assembled onto a substrate according to the teachings of the following references may be readily adapted according to the present disclosure for packaging and fiber-coupling. The references disclose assembly of optical devices onto a device substrate that includes one or more planar waveguides thereon. The assembled components may be optically coupled to the planar waveguide(s).

One of the planar waveguides may be adapted for supporting an optical mode suitable for coupling to an optical fiber, and may be suitably positioned on the substrate relative to the fiber groove for optical coupling as set forth hereinabove. The following are incorporated by reference as if fully set forth herein:

U.S. non-provisional application Ser. No. 10/187,030 (U.S. patent application Pub. No. 2003/0081902) entitled "Optical junction apparatus and methods employing optical power transverse-transfer" filed Jun. 28, 2002 in the names of Henry A. Blauvelt, Kerry J. Vahala, David W. Vernooy, and Joel S. Paslaski; and U.S. non-provisional application Ser. No. 10/652,955 entitled "Optical assemblies for free-space optical propagation between waveguide(s) and/or fiber(s)" filed Aug. 29, 2003 in the names of Henry A. Blauvelt, David W. Vernooy, and Joel S. Paslaski.

The phrase "operationally acceptable" appears herein describing levels of optical coupling achieved by aligning the optical fiber 130*a* seated within groove 140*h* on substrate 140*d*. An operationally acceptable level of optical coupling may be determined by any relevant set or subset of applicable constraints and/or requirements arising from the performance, fabrication, device yield, assembly, testing, availability, cost, supply, demand, and/or other factors surrounding the manufacture, deployment, and/or use of a particular packaged fiber-coupled optical device. Such "operationally acceptable" levels of optical coupling may therefor vary within a given class of devices depending on such constraints and/or requirements. For example, a lower optical coupling efficiency may be an acceptable trade-off for achieving lower device fabrication/assembly costs in some instances, while higher optical coupling may be required in other instances in spite of higher fabrication/assembly costs. The "operationally acceptable" optical coupling efficiency therefore varies between the instances. Packaging of fiber-coupled optical devices as disclosed herein, and equivalents thereof, may therefore be implemented within tolerances of varying precision depending on such "operationally acceptable" optical coupling.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising:
   an alignment housing having a fiber retainer;
   a segment of optical fiber mounted on the alignment housing with a first end of the fiber segment against the fiber retainer; and
   an optical device subassembly, comprising a device substrate with at least one optical component thereon and with a fiber groove thereon, mounted on the alignment housing with the first end of the fiber segment engaged with the fiber groove,
   wherein the fiber retainer urges the first end of the fiber segment into the fiber groove, and the fiber groove positions the first end of the fiber segment engaged therewith for optical coupling with at least one optical component on the substrate.

2. The apparatus of claim 1, wherein the alignment housing is configured for aligning a second end of the fiber segment with a second optical fiber for optical end-coupling therebetween by engaging a mating fiber-optic connector on the second optical fiber.

3. The apparatus of claim 1, further comprising a fiber ferrule, wherein:
   the fiber segment is received within the fiber ferrule with the first end of the fiber segment protruding from a first end of the fiber ferrule;
   the fiber ferrule is mounted on the alignment housing, thereby mounting the fiber segment on the alignment housing with the protruding first end of the optical fiber segment against the fiber retainer.

4. The apparatus of claim 3, wherein a second end of the fiber segment protrudes from a second end of the fiber ferrule.

5. The apparatus of claim 4, further comprising a fiber-optic connector on the second end of the fiber segment.

6. The apparatus of claim 3, wherein the second end of the fiber segment terminates within the fiber ferrule, and a second end of the fiber ferrule forms a receptacle for receiving a second optical fiber therein for optical end-coupling with the second end of the fiber segment.

7. The apparatus of claim 3, further comprising a fiber sleeve with the fiber ferrule received therein, wherein:
   the fiber sleeve is mounted on the alignment housing, thereby mounting the fiber ferrule on the alignment housing;
   a second end of the fiber segment is substantially flush with a second end of the fiber ferrule;
   the first end of the fiber ferrule protrudes from a first end of the fiber sleeve and the second end of the fiber ferrule terminates within the fiber sleeve; and
   the fiber sleeve is configured for aligning the second end of the fiber segment with a second optical fiber for optical end-coupling therebetween by engaging within a second end of the fiber sleeve a mating fiber-optic connector on the second optical fiber.

8. The apparatus of claim 1, wherein a second end of the fiber segment protrudes from the alignment housing.

9. The apparatus of claim 8, further comprising a fiber-optic connector on the second end of the fiber segment.

10. The apparatus of claim 1, further comprising an electrical connection to at least one optical component of the device subassembly.

11. The apparatus of claim 10, wherein the electrical connection comprises a flexible circuit.

12. The apparatus of claim 10, further comprising an electromagnetic shield secured to the apparatus so as to at least partially enclose at least one optical component thereof.

13. The apparatus of claim 1, further comprising an enclosure housing secured to the alignment housing so as to at least partially enclose the fiber segment and the device subassembly.

14. The apparatus of claim 1, wherein at least one optical component of the device subassembly is a laser.

15. The apparatus of claim 1, wherein at least one optical component of the device subassembly is an optical modulator.

16. The apparatus of claim 1, wherein at least one optical component of the device subassembly is a photodetector.

17. The apparatus of claim 1, wherein at least one optical component of the device subassembly is an optical filter.

18. The apparatus of claim 1, further comprising:
   multiple segments of optical fiber, each fiber segment mounted on the alignment housing with a respective first end thereof positioned against the fiber retainer;
   multiple optical components; and multiple fiber grooves, wherein respective first ends of the multiple fiber segments are each engaged with a corresponding one of the multiple fiber grooves, the fiber retainer urges the respective first ends of the multiple fiber segments into the corresponding one of the multiple fiber grooves, and each of the multiple fiber grooves positions the first end of the corresponding fiber segment engaged therewith for optical coupling with at least one of the optical components.

19. The apparatus of claim 18, wherein the alignment housing is configured for aligning a respective second end of each of the multiple fiber segments with a corresponding one of multiple optical fibers for optical end-coupling therebetween by engaging a mating multiple-fiber connector on the multiple optical fibers.

20. The apparatus of claim 18, wherein the multiple optical components and multiple fiber grooves are on a common device substrate.

21. The apparatus of claim 1, wherein:

the fiber retainer comprises a resilient fiber-retaining arm; and the fiber-retaining arm is deflected by the first end of the fiber segment and the optical device subassembly, and the resilience of the fiber-retaining arm serves to urge the first end of the fiber segment into the fiber groove.

22. The apparatus of claim 21, wherein the fiber-retaining arm and the alignment housing form an integral structure formed from a common material.

23. The apparatus of claim 21, wherein the fiber-retaining arm and the alignment housing form an integral structure formed from a common polymer material.

24. The apparatus of claim 1, wherein:

the fiber retainer comprises a resilient fiber-retaining cross member; and the fiber-retaining cross member is deflected by the first end of the fiber segment and the optical device subassembly, and the resilience of the fiber-retaining cross member serves to urge the first end of the fiber segment into the fiber groove.

25. The apparatus of claim 24, wherein the fiber-retaining cross member is assembled with the alignment housing with each end of the fiber-retaining cross member received in a corresponding slot of the alignment housing.

26. The apparatus of claim 25, wherein the alignment housing comprises a polymer material, and the fiber-retaining cross member comprises metal.

27. The apparatus of claim 1, wherein the alignment housing includes an external alignment reference for aiding alignment of a second end of the fiber segment with a second optical fiber for optical end-coupling therebetween.

28. The apparatus of claim 1, wherein the alignment housing includes an internal alignment reference for aiding mounting of the optical device subassembly on the alignment housing with the first end of the fiber segment engaged with the fiber groove.

* * * * *

UNITED STATES PATENT AND TRADEMARK OFFICE
CERTIFICATE OF CORRECTION

PATENT NO.       : 6,942,397 B2
APPLICATION NO.  : 10/898153
DATED            : September 13, 2005
INVENTOR(S)      : Benzoni et al.

It is certified that error appears in the above-identified patent and that said Letters Patent is hereby corrected as shown below:

Column 10, line 17, Claim 6        Delete "the second",
                                   Insert --a second--

Signed and Sealed this

Twenty-fifth Day of July, 2006

JON W. DUDAS
*Director of the United States Patent and Trademark Office*